US010518850B2

(12) United States Patent
Page

(10) Patent No.: US 10,518,850 B2
(45) Date of Patent: Dec. 31, 2019

(54) HIGH SPEED FAIRING BLOCK SYSTEMS AND METHODS

(71) Applicant: FLIR Belgium BVBA, Meer (BE)

(72) Inventor: Christopher R. Page, Southampton (GB)

(73) Assignee: FLIR Belgium BVBA, Meer (BE)

( * ) Notice: Subject to any disclaimer, the term of this patent is extended or adjusted under 35 U.S.C. 154(b) by 432 days.

(21) Appl. No.: 15/179,880

(22) Filed: Jun. 10, 2016

(65) Prior Publication Data

US 2016/0362164 A1 Dec. 15, 2016

Related U.S. Application Data

(60) Provisional application No. 62/175,195, filed on Jun. 12, 2015.

(51) Int. Cl.
| | | |
|---|---|---|
| *G01S 7/00* | (2006.01) | |
| *B63B 49/00* | (2006.01) | |
| *G01S 7/521* | (2006.01) | |
| *G01S 15/89* | (2006.01) | |
| *G01S 15/96* | (2006.01) | |
| *G01S 15/02* | (2006.01) | |
| *G01S 13/86* | (2006.01) | |

(52) U.S. Cl.
CPC .............. *B63B 49/00* (2013.01); *G01S 7/521* (2013.01); *G01S 13/862* (2013.01); *G01S 15/025* (2013.01); *G01S 15/8902* (2013.01); *G01S 15/96* (2013.01)

(58) Field of Classification Search
USPC ......................................................... 367/173
See application file for complete search history.

(56) References Cited

U.S. PATENT DOCUMENTS

| | | | | | |
|---|---|---|---|---|---|
| 3,613,627 | A | * | 10/1971 | Kennedy ............... | B63B 21/663 114/243 |
| 3,990,035 | A | * | 11/1976 | Byers .................... | G10K 11/006 367/141 |
| 4,140,992 | A | * | 2/1979 | Wardle .................... | B63G 8/39 367/153 |
| 4,655,155 | A | * | 4/1987 | Folb ....................... | B63B 21/663 114/243 |
| 5,265,069 | A | * | 11/1993 | Wardle ................. | G10K 11/006 367/153 |
| 5,335,620 | A | * | 8/1994 | Small .................... | B63B 21/663 114/243 |

(Continued)

*Primary Examiner* — James R Hulka
(74) *Attorney, Agent, or Firm* — Haynes and Boone, LLP

(57) ABSTRACT

Systems and methods are disclosed to provide a fairing block that couples a sonar transducer to a hull of a mobile structure. The fairing block includes a leading edge that diverts water and bubbles in the water laterally around the fairing block and the sonar transducer. A bottom of the leading edge provides a substantially undisturbed water flow over a working face of the sonar transducer while the mobile structure is in motion. The bottom of the leading edge may include a curvilinearly chamfered surface that helps prevent cavitation along the working face of the transducer. One or more lateral cutouts are disposed behind the leading edge to expose lateral sides of the sonar transducer to the water. The lateral sides of the sonar transducer may be metallic and exposed to water by the lateral cutouts, thereby dissipating heat generated within the sonar transducer to the water.

20 Claims, 16 Drawing Sheets

(56) References Cited

U.S. PATENT DOCUMENTS

| | | | | |
|---|---|---|---|---|
| 5,717,657 | A | * | 2/1998 | Ruffa .................... G10K 11/16 367/131 |
| 6,016,286 | A | * | 1/2000 | Olivier ................... B63B 21/66 114/245 |
| 6,377,516 | B1 | * | 4/2002 | Whiteside ............ G10K 11/006 367/173 |
| 7,490,573 | B1 | * | 2/2009 | Dickinson ............. B63B 21/663 114/243 |
| 2007/0157864 | A1 | * | 7/2007 | Aldin .................... B63B 1/107 114/281 |
| 2007/0203623 | A1 | * | 8/2007 | Saunders ............. G05D 1/0206 701/23 |
| 2011/0004367 | A1 | * | 1/2011 | Saunders ............. G05D 1/0206 701/23 |

* cited by examiner

HIGH SPEED FAIRING BLOCK SYSTEMS AND METHODS

CROSS-REFERENCE TO RELATED APPLICATIONS

This application claims priority to and the benefit of U.S. Provisional Patent Application No. 62/175,195 filed Jun. 12, 2015 and entitled "HIGH SPEED FAIRING BLOCK SYSTEMS AND METHODS", which is hereby incorporated by reference in its entirety.

TECHNICAL FIELD

One or more embodiments of the invention relate generally to sonar systems and more particularly, for example, to systems and methods for implementing fairing blocks for sonar systems.

BACKGROUND

Sonar may be used to perform a number of functions important to travel over or through water, such as to perform bathymetry, detect underwater hazards, find fish, and/or otherwise assist in navigation by producing data and/or imagery of a water column beneath a watercraft. Sonar systems often include at least one sonar transducer positioned to receive sonar returns, which can in turn be converted to sonar data and/or recognizable sonar imagery. A typical sonar transducer may be positioned within a fairing block mounted to the hull of a watercraft.

Conventional fairing blocks create turbulence as the watercraft travels over or through the water, particularly as the speed of the watercraft increases, and the turbulence may cause cavitation near or beneath the sonar transducer, which degrades the performance of the sonar transducer by introducing noise into the sonar returns and/or otherwise reducing the ability of the transducer to couple with, receive, and/or generate sound waves in the water. Furthermore, turbulence and/or cavitation near a sonar transducer may cause physical deterioration of and/or damage to the sonar transducer and/or other portions of the watercraft. As a result, operation and maintenance of a sonar transducer mounted to a watercraft using a conventional fairing block may be costly and time-consuming. Moreover, the effect is multiplied as the number of sonar transducers installed on a single mobile structure increases. Repairing or replacing one or more sonar transducers can require substantial down time while new sonar transducers are mounted to the mobile structure, and often results in lost productivity and/or decreased operational safety. Thus, there is a need for sonar systems implemented with improved fairing blocks, particularly in the context of sonar transducers mounted to watercraft travelling and navigating through water.

SUMMARY

Techniques are disclosed for systems and methods to provide sophisticated sonar transducer assemblies with sleeker, more hydrodynamic fairing blocks used to positionally mount the transducer assemblies to mobile structures. A system may include a fairing block that couples a sonar transducer to a hull or other exterior of a mobile structure and compensates for a dead rise angle of the hull or exterior surface. Such fairing block may also be configured to substantially electrically isolate the sonar transducer from the mobile structure to prevent electrolytic corrosion of the sonar transducer. The fairing block may include a leading edge formed or shaped to displace water laterally around the sonar transducer. A bottom of the leading edge may be formed or shaped to provide a relatively smooth or undisturbed flow of the water over a working face of the sonar transducer even at increased speeds of the mobile structure. A lateral cutout disposed behind the leading edge may be form-fitted to the sonar transducer to reduce the overall profile of the transducer assembly, and in some embodiments, may expose the lateral sides of the sonar transducer to the water.

In one embodiment, a system may include a fairing block configured to couple a sonar transducer to a hull of a mobile structure, where the fairing block includes a leading edge configured to displace water laterally around the sonar transducer, and where a bottom of the leading edge is configured to provide a substantially undisturbed water flow over a working face of the sonar transducer. The fairing block may also include one or more lateral cutouts disposed behind the leading edge and configured to expose lateral sides of the sonar transducer to the water.

In another embodiment, a method may include providing a fairing block configured to couple a sonar transducer to a hull of a mobile structure, where providing the fairing block includes forming a leading edge of the fairing block configured to displace water laterally around the sonar transducer, forming a bottom of the leading edge configured to provide a substantially undisturbed water flow over a working face of the sonar transducer, and forming one or more lateral cutouts disposed behind the leading edge that are configured to expose lateral sides of the sonar transducer to the water.

In various embodiments, the one or more lateral cutouts of the fairing block may be configured to expose at least a portion of the lateral sides of the sonar transducer to the water to minimize the overall profile of the constituent transducer assembly and/or to help dissipate heat generated within the sonar transducer.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 2A-K illustrate various views of a fairing block and/or sonar transducer in accordance with embodiments of the disclosure.

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, a mobile structure may advantageously include one or more sonar systems, each including at least one sonar transducer mounted to the mobile structure using a fairing block. Each fairing block may be mounted, attached, and/or fixed to the hull of the mobile structure (e.g., a watercraft, aircraft, motor vehicle, and/or other mobile structure) and cut or otherwise shaped to compensate for a range of curves or dead rise angles of the hull and/or various hull surfaces. Each sonar transducer may be positioned to be facing substantially downward (e.g., with the mobile structure at rest) in order to facilitate operation of the sonar transducer in accord with a downward facing sonar system.

Embodiments of the present disclosure may provide a number of advantages over conventional systems and/or methods through the use of sleeker, more hydrodynamic, and/or form-fitting fairing blocks as compared to conventional fairing blocks. By reducing the overall size and/or profile of the fairing block, embodiments of the present disclosure reduce the amount of turbulence created as the mobile structure travels through water, thereby improving the consistency of the flow of the water around the transducer. The improved flow enhances the sonar transducer's ability to operate without noise or interference. Moreover, the improved flow prevents cavitation near or under the sonar transducer, thereby reducing the risk of damage to the sonar transducer over time. Embodiments further reduce risk of damage to the sonar transducer by providing increased dissipation of heat generated within the sonar transducer, as described more fully herein.

Figure 1A:
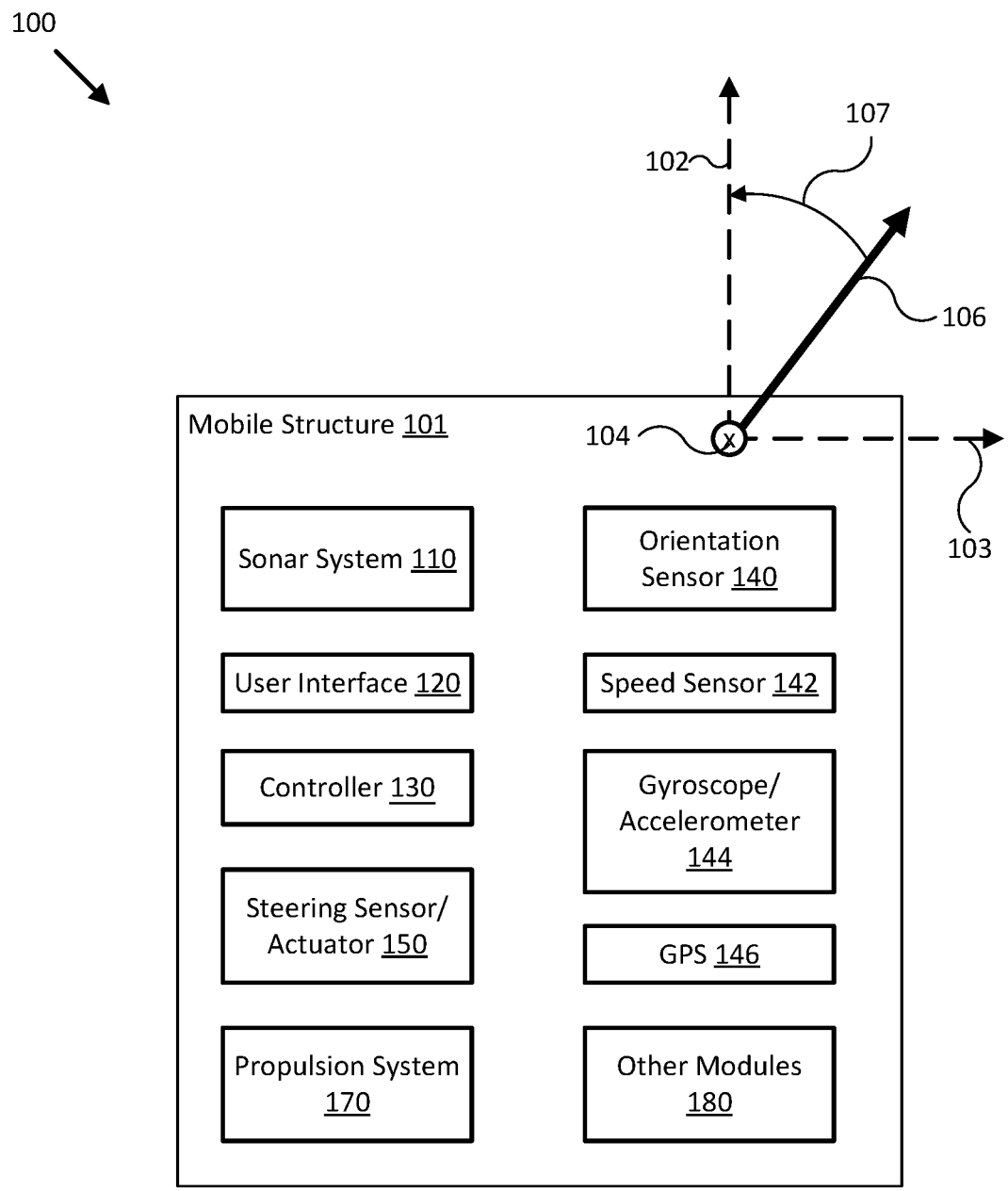
FIG. 1A illustrates a block diagram of a sonar system in accordance with an embodiment of the disclosure.

FIG. 1A illustrates a block diagram of system 100 in accordance with an embodiment of the disclosure. In various embodiments, system 100 may be adapted to provide sonar data and/or imagery with respect to operation of mobile structure 101 through use of sonar system 110. In some embodiments, system 100 may be adapted to measure an orientation, a position, an acceleration, and a speed of mobile structure 101 and/or sonar system 110. System 100 may use such configurations and/or measurements to form various views of sonar data provided by sonar system 110 and/or to adjust an orientation of sonar system 110 according to a desired operation of sonar system 110 and/or mobile structure 101, In some embodiments, system 100 may display resulting sonar data and/or imagery to a user through user interface 120, and/or use the sonar data and/or imagery to control operation of mobile structure 101, such as controlling steering actuator 150 and/or propulsion system 170 to steer mobile structure 101 according to a desired heading, such as heading angle 107, for example.

In the embodiment shown in FIG. 1A, system 100 may be implemented to provide sonar data and/or imagery for a particular type of mobile structure 101, such as a drone, a watercraft, an aircraft, a robot, a vehicle, and/or other types of mobile structures. In one embodiment, system 100 may include one or more of a sonar system 110, a user interface 120, a controller 130, an orientation sensor 140, a speed sensor 142, a gyroscope/ accelerometer 144, a global positioning satellite system (GPS) 146, a steering sensor/actuator 150, a propulsion system 170, and one or more other sensors and/or actuators, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope 144 and accelerometer 145), As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation). In some embodiments, directional measurements may initially be referenced to a coordinate frame of a particular sensor (e.g., a sonar transducer assembly or module of sonar system 110) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 referenced to a local gravitational vector but with an unreferenced and/or undefined yaw reference (e.g., no reference to Magnetic North).

Sonar system 110 may be implemented as one or more electrically and/or mechanically coupled controllers, transmitters, receivers, transceivers, signal processing logic devices, various electrical components, transducer elements of various shapes and sizes, multichannel transducers/transducer modules, transducer assemblies, assembly brackets, transom brackets, fairing blocks, and/or various actuators adapted to adjust orientations of any of the components of sonar system 110, as described herein. Sonar system 110 may be configured to emit one, multiple, or a series of acoustic beams, receive corresponding acoustic returns, and convert the acoustic returns into sonar data and/or imagery, such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

In some embodiments, sonar system 110 may be implemented using a compact design, where multiple sonar transducers, sensors, and/or associated processing devices are located within a single transducer assembly housing. In some embodiments, sonar system 110 may include orientation and/or position sensors configured to help provide two or three dimensional waypoints, increase sonar data and/or imagery quality, and/or provide highly accurate bathymetry data, as described herein.

In various embodiments, sonar system 110 may be configured to provide many different display views from a variety of selectable perspectives, including a downward viewing perspective, a side viewing perspective, a three dimensional perspective, and/or other types of sonar imaging, all using one or more user interfaces 120 but with different selectable configurations and/or processing methods, as described herein.

In general, embodiments of sonar system 110 may be configured to transmit acoustic beams of various selectable shapes and sizes, receive acoustic returns, and to provide the acoustic returns to user interface 120 in the form of data and/or sonar imagery, as described herein. In some embodiments, sonar system 110 may be implemented with optional orientation and/or position sensors (e.g., similar to orientation sensor 140, gyroscope/accelerometer 144, and/or GPS 146) that may be incorporated within a transducer assembly housing to provide three dimensional orientations and/or positions of the transducer assembly for use when processing or post processing sonar data for display. The sensor information can be used to correct for movement of transducer assemblies between ensonifications to provide improved alignment of corresponding acoustic returns/samples, for example, and/or to generate imagery based on the measured orientations and/or positions. In other embodiments, an external orientation and/or position sensor can be used alone or in combination with an integrated sensor or sensors.

In embodiments where sonar system 110 is implemented with an orientation and/or position sensor, system 100 may be configured to store such location/position information along with other sensor information (acoustic returns, temperature measurements, text descriptions, water depth, altitude, mobile structure speed, and/or other sensor and/or control information) and/or configuration data available to system 100. In some embodiments, controller 130 may be configured to generate a look up table so that a user can select desired configurations of sonar system 110 for a particular location or to coordinate with some other sensor information. Alternatively, an automated adjustment algorithm can be used to select optimum configurations based on the sensor information and/or a set of selected configurations.

For example, in one embodiment, mobile structure 101 may be located in an area identified on an chart using position data, a user may have selected a user setting for a configuration of sonar system 110, and controller 130 may be configured to implement the configuration for sonar system 110 (e.g., to set a particular channel selection). In another embodiment, controller 130 may be configured to determine water depth and/or altitude, and use such data to control a configuration setting of sonar system 110 to maintain an optimum channel/frequency for the reported depths/altitudes. In yet another embodiment, a user may be searching for fish in a wide area and may select a configuration setting that will adjust a transducer assembly configuration to ensonify a relatively broad, shallow area. In still another embodiment, controller 130 may be configured to receive orientation measurements for mobile structure 101. In such embodiment, controller 130 may be configured to control ensonification with respect to a transducer assembly to maintain its orientation relative to, for example, the water surface during periodic ensonifications, and thus improve the displayed sonar images (e.g., by ensuring consistently oriented acoustic beams and/or proper registration of a series of acoustic returns). In various embodiments, controller 130 may be configured to control steering sensor/actuator 150 and/or propulsion system 170 to adjust a position and/or orientation of mobile structure 101 to help ensure proper registration of a series of acoustic returns, sonar data, and/or sonar imagery.

Although FIG. 1A shows various sensors and/or other components of system 100 separate from sonar system 110, in other embodiments, any one or combination of sensors and components of system 100 may be integrated with a sonar assembly, an actuator, a transducer module, and/or other components of sonar system 110. For example, orientation sensor 140 may be integrated with a transducer assembly of sonar system 110 and be configured to provide measurements of an absolute and/or relative orientation (e.g., a roll, pitch, and/or yaw) of the transducer assembly to controller 130 and/or user interface 120, either of which may also be integrated with sonar system 110.

User interface 120 may be implemented as a display, a touch screen, a keyboard, a mouse, a joystick, a knob, a steering wheel, a ship's wheel or helm, a yoke, and/or any other device capable of accepting user input and/or providing feedback to a user. In various embodiments, user interface 120 may be adapted to accept user input and provide the user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), render and/or display a user interface, determine various coordinate frames and/or orientations, determine parameters for one or more coordinate frame transformations, and/or perform coordinate frame transformations, for example, or to perform various other processes and/or methods.

In various embodiments, user interface 120 may be adapted to accept user input, for example, to configure sonar system 110, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be processed internally and/or transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101. In such embodiment, user interface 120 may be adapted to process the sensor signals to determine sensor information indicating an estimated and/or absolute roll, pitch, and/or yaw (attitude and/or rate), and/or a position or series of positions of mobile structure 101, for example, and display the sensor information as feedback to a user. In one embodiment, user interface 120 may be adapted to display a time series of various sensor information and/or other parameters as part of or overlaid on a graph or map, which may be referenced to a position and/or orientation of mobile structure 101. For example, user interface 120 may be adapted to display a time series of positions, headings, and/or orientations of mobile structure 101 and/or other elements of system 100 (e.g., a transducer assembly of sonar system 110) overlaid on a geographical map, which may include one or more graphs indicating a corresponding time series of actuator control signals, sonar data and/or imagery, and/or other sensor and/or control signals.

In some embodiments, user interface 120 may be adapted to accept user input including a user-defined target heading, route, and/or orientation for a transducer assembly, for example, and to generate control signals for steering sensor/actuator 150 and/or propulsion system 170 to cause mobile structure 101 to move according to the target heading, route, and/or orientation. In further embodiments, user interface 120 may be adapted to accept user input including a user-defined target attitude for an actuated device coupled to mobile structure 101 (e.g., sonar system 110), for example, and to generate control signals for adjusting an orientation of the actuated device according to the target attitude. More generally, user interface 120 may be adapted to display a user interface and/or sensor information to a user, for example, and/or to transmit sensor information and/or user input to other user interfaces, sensors, or controllers of system 100, for instance, for display and/or further processing.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of sonar system 110, steering sensor/actuator 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store configuration settings, sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for actuated device control, steering control (e.g., using steering sensor/actuator 150) and/or performing other various operations of mobile structure 101 and/or system 100. In some embodiments, a control loop may include processing sensor signals and/or sensor information in order to control one or more operations of sonar system 110, mobile structure 101, and/or system 100.

Orientation sensor 140 may be implemented as one or more of a compass, float, accelerometer, and/or other device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a time series of orientation measurements). Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). Gyroscope/ accelerometer 144 may be positioned and/or adapted to make such measurements in relation to a particular coordinate frame of mobile structure 101, for example. In various embodiments, gyroscope/ accelerometer 144 may be implemented in a common housing and/or module to ensure a common reference frame or a known transformation between reference frames.

GPS 146 may be implemented as a global positioning satellite receiver and/or other device capable of determining absolute and/or relative position of mobile structure 101 based on wireless signals received from space-born and/or terrestrial sources, for example, and capable of providing such measurements as sensor signals that may be communicated to various devices of system 100. In some embodiments, GPS 146 may be adapted to determine a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Steering sensor/actuator 150 may be adapted to physically adjust a heading of mobile structure 101 according to one or more control signals, user inputs, and/or other signals provided by a logic device of system 100, such as controller 130. Steering sensor/actuator 150 may include one or more actuators and control surfaces (e.g., a rudder or other type of steering mechanism) of mobile structure 101, and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 150, for example, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/ port (e.g., used to steer the watercraft), a sail, or an aircraft propeller or turbine with a variable thrust vector, for example.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated devices (e.g., spotlights, cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of mobile structure 101 and/or sonar system 110 from various sensors, to determine a transducer orientation adjustment (e.g., relative to a desired transducer orientation) from the sensor signals, and/or to control an actuator to adjust a transducer orientation accordingly, for example. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein. For example, the same or similar components may be used to produce an acoustic beam, receive an acoustic return (e.g., a sound wave received by a sonar transducer element and/or corresponding electrical signals from the sonar transducer element), convert the acoustic return to acoustic return data, and/or store sensor information, configuration data, and/or other data corresponding to operation of sonar system 110, as described herein. Specifically, sonar system 110 may be implemented with a sonar controller similar to controller 130 but with components (e.g., a transmitter and/or receiver) adapted to provide signals to a transducer assembly to produce acoustic beams and/or to receive signals from the transducer assembly and convert them to acoustic return data. Such sonar controllers may be separate from or integrated with a transducer assembly of sonar system 110 and/or a user interface (user interface 120). Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various sensor measurements. For example, gyroscope/accelerometer 144 and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of sonar system 110 and/or other sensors of system 100 to/from a coordinate frame of mobile structure 101, at-rest and/or in-motion, and/or other coordinate frames, as described herein. One or more logic devices of system 100 may be adapted to use such parameters to transform a coordinate frame of sonar system 110 and/or other sensors of system 100 to/from a coordinate frame of orientation sensor 140 and/or mobile structure 101, for example. Furthermore, such parameters may be used to determine and/or calculate one or more adjustments to an orientation of sonar system 110 that would be necessary to physically align a coordinate frame of sonar system 110 with a coordinate frame of orientation sensor 140 and/or mobile structure 101, for example, or an absolute coordinate frame. Adjustments determined from such parameters may be used to selectively power adjustment servos/actuators (e.g., of sonar system 110 and/or other sensors or elements of system 100), for example, or may be communicated to a user through user interface 120, as described herein.

Figure 1B:
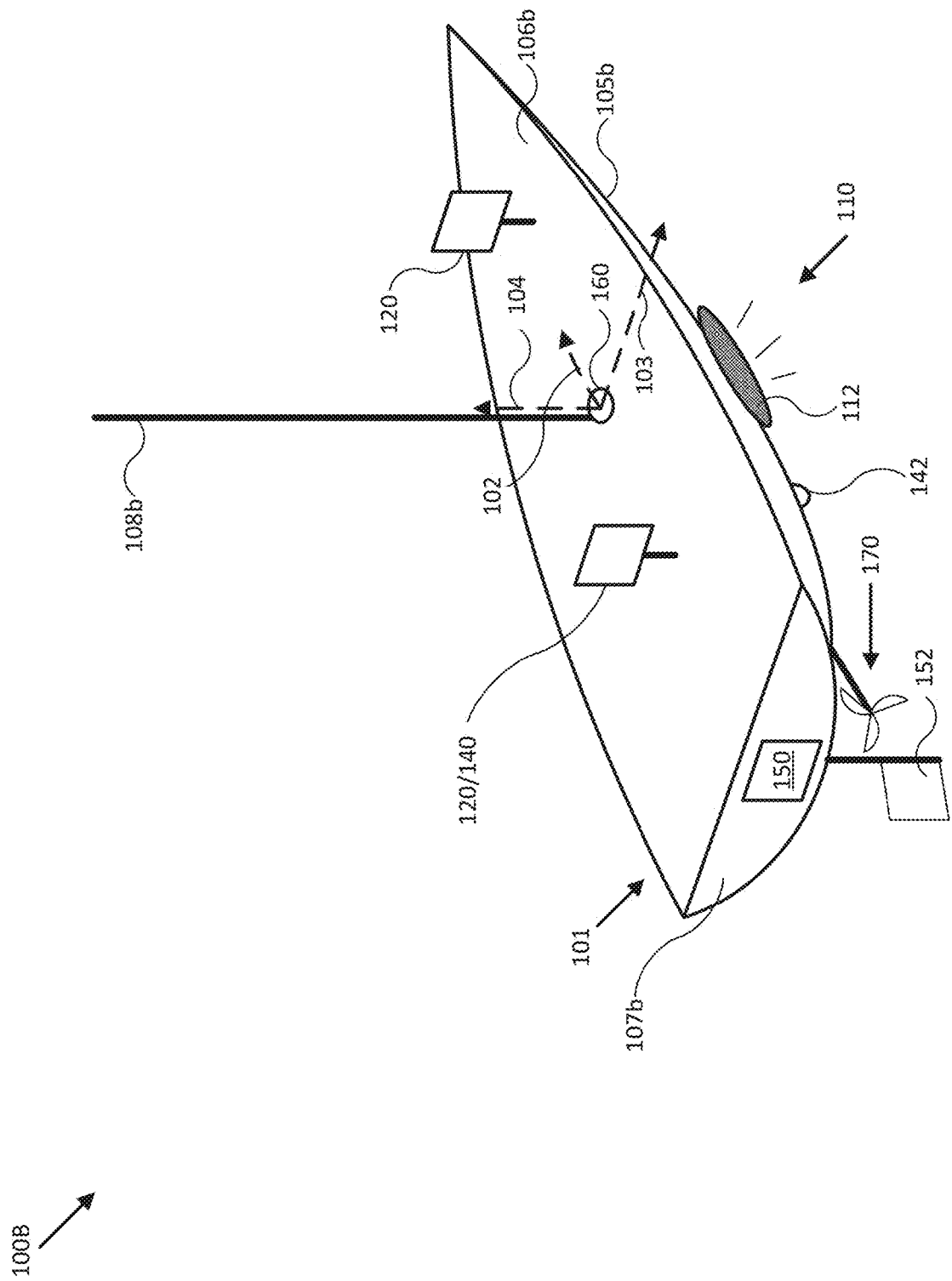
FIG. 1B illustrates a diagram of a sonar system in accordance with an embodiment of the disclosure.

FIG. 1B illustrates a diagram of system 100B in accordance with an embodiment of the disclosure. In the embodiment shown in FIG. 1B, system 100B may be implemented to provide sonar data and/or imagery for use with operation of mobile structure 101, similar to system 100 of FIG. 1A. For example, system 100B may include sonar system 110, integrated user interface/controller/sonar controller 120/130, secondary user interface 120, steering sensor/actuator 150, sensor cluster 160 (e.g., orientation sensor 140, gyroscope/accelerometer 144, and/or GPS 146), and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, and hull mounted sonar system 110 including transducer assembly 112 (itself including a fairing block) coupled to hull 105b. In various embodiments, transducer assembly 112 may include a sonar transducer casted, molded, encapsulated, and/or form-fitted into a fairing block, as described more fully herein. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes sonar system 110, which in turn includes transducer assembly 112 coupled directly to hull 105b. Transducer assembly 112 may also be integrated with a number of sensors such as an orientation sensor, a gyroscope, an accelerometer, an orientation sensor, and/or a position sensor configured to provide measurements of an orientation, a position, and/or an acceleration of transducer assembly 112. In various embodiments, user interface/controller/sonar controller 120/130 may be adapted to provide a user interface allowing a user to configure operation of transducer assembly 112 and/or other transducer assemblies of sonar system 110. It should be noted that mobile structure 101 may include additional transducer assemblies that maybe installed and/or mounted in a number of different arrangements with transducer assembly112 to increase the amount of sonar data obtained and/or to enhance resulting sonar imagery.

In some embodiments, user interface/controller/sonar controller 120/130 may be adapted to receive an orientation of transducer assembly 112 configured to ensonify a portion of surrounding water and/or a direction referenced to an absolute coordinate frame, and to adjust a timing of ensonification by transducer assembly 112 to retain ensonification of the position and/or direction in response to motion of mobile structure 101, using one or more orientations and/or positions of mobile structure 101, transducer assembly 112, and/or other sensor information derived by executing various methods described herein. In another embodiment, user interface/controller/sonar controller 120/130 may be configured to adjust a timing of ensonification by transducer assembly 112 to direct sonar transmissions from transducer assembly 112 substantially downwards and/or along an underwater track during motion of mobile structure 101. In such embodiment, the underwater track may be predetermined, for example, or may be determined based on criteria parameters, such as a minimum allowable depth, a maximum ensonified depth, a bathymetric route, and/or other criteria parameters. Thus, the transducer assemblies 112 may be used to provide enhanced sonar imagery (e.g., increased breadth of coverage, increased image detail, and/or other types of sonar imagery enhancements) in relation to the mobile structure 101.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 stays substantially level with respect to a horizon and/or a "down" vector (e.g., to mimic typical user head motion/orientation). In another embodiment, at least one of user interfaces 120 may be located in proximity to mobile structure 101 and be mobile throughout a user level (e.g., deck 106b) of mobile structure 101. For example, secondary user interface 120 may be implemented with a lanyard and/or other type of strap and/or attachment device and be physically coupled to a user of mobile structure 101 so as to be in proximity to mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105*b*, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105*b*. In alternative embodiments, speed sensor 142 may be implemented as a wind velocity sensor, for example, and may be mounted to mast/sensor mount 108*b* to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108*b* (e.g., near a center of gravity of mobile structure 101). In one embodiment, the various axes may define a coordinate frame of mobile structure 101 and/or sensor cluster 160. Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cells or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Figure 2A:
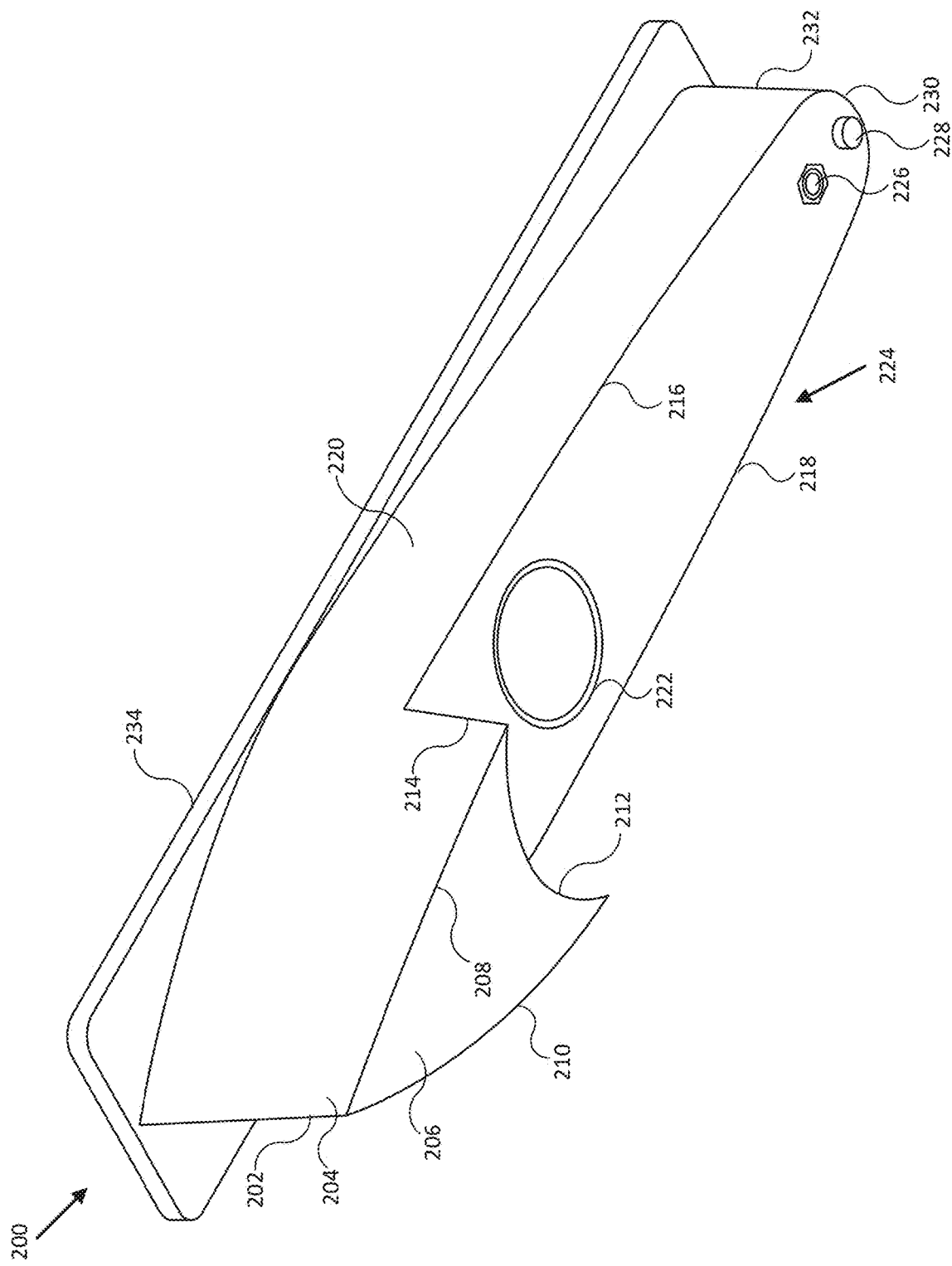

FIG. 2A illustrates a front-left-bottom perspective view of fairing block 200 in accordance with an embodiment of the disclosure. As provided, fairing block 200 may be attached, mounted, and/or fixed to mobile structure 101 described above, possibly similar to transducer assembly 112 described above in relation to FIG. 1B. For example, fairing block 200 may be configured to couple a sonar transducer to various areas of hull 105*b* and/or to help electrically isolate the sonar transducer from hull 105*b*, thereby preventing electrolytic corrosion of the sonar transducer. In particular, fairing block 200 may be composed of a polypropylene, a polymer, a low- or high-impact polymer, and/or other types of materials to substantially electrically isolate the sonar transducer from hull 105*b*. In some instances, such compositions may allow fairing block 200 to be modified and/or shaped (e.g., with a band saw or coping saw) and thereafter mounted to one of a range of locations along hull 105*b* to be positioned at a selected depth relative to the surface of the water and the bottom of hull 105*b*. In various embodiments, fairing block 200 may be configured to compensate for a wide range of dead rise angles of hull 105*b* (e.g., the angle of the surface of hull 105*b* relative to the surface of water, while mobile structure 101 is at rest, taken at a particular position along the curvature of hull 105*b*) ranging from approximately 0 to 40 degrees. Wider conventional fairing blocks are typically unable to compensate for a similar range of dead rise angles of a hull without also being tall enough to present a substantial risk of impact with a floor of a body of water, because they extend substantially below a bottom of the hull.

As shown, fairing block 200 may include a leading edge 202 that displaces water, bubbles, and/or debris in the water laterally around fairing block 200 as the block moves through water. As shown, leading edge 202 may be rounded, curved, and/or sharpened to cut through the water and/or bubble layers in the water. Leading edge 202 may be configured to displace the water and/or divert bubbles laterally around fairing block 200 with minimal resistance, friction, and/or turbulence. Thus, leading edge 202 (e.g., and/or other features of fairing block 200) may enable fairing block 200 to move through water over a multitude of different speeds, ranging across low speeds (e.g., lower than approximately 10 mph), medium speeds (e.g., approximately 10-20 mph), and/or relatively high speeds (e.g., higher than approximately 20 mph), without introducing substantial turbulence or cavitation near a coupled sonar transducer. Further, leading edge 202 may help reduce or eliminate turbulence and/or cavitation while moving through water with varying conditions such as choppy waters, varying wave heights, and/or changing tides.

As used herein, the described low, medium, and high speed ranges are presented in the context of sonar data acquisition, where conventional systems are typically reliable when used in the range of low speeds, but become unreliable (e.g., unable to track bottom, noise level substantially the same or higher than data from non-turbulence related features in the water) when used in the range of medium speeds, and are typically unusable in the range of high speeds. For example, conventional systems typically become unreliable at speeds greater than approximately 18 mph (e.g., ~16 knots).

As illustrated, leading left side 204 and leading edge bottom 206 are adjacent to leading edge 202. Leading edge bottom 206 may provide an undisturbed flow of water underneath or below fairing block 200. For example, leading edge bottom 206 may include a gradual curvilinearly chamfered surface between edges 208 and 210 that provides a smooth flow of water underneath or below fairing block 200. Leading left side 204, leading edge bottom 206, and/or edges 208 and 210 may be smooth and/or curved to move through the water and/or bubble layers and displace the water and/or bubbles with minimal resistance, friction, and/or turbulence. Leading left side 204, leading edge bottom 206, and/or edges 208 and 210 may also facilitate moving through water over a range of speeds and through varying water conditions as described above.

As shown, cutout edge 212 and lateral cutout 224 (formed by cutout edges 214, 216, and/or 218) may be designed to hold or encapsulate a sonar transducer and expose portions of the sonar transducer. Further, cutout edge 212 and lateral cutout 224 may be formed, shaped, and/or molded to fit a sonar transducer for a sleeker and/or more hydrodynamic design to minimize drag when moving through water. Left side tail 220 is adjacent to leading left side 204 such that the displaced water, bubbles, and/or debris may continue to pass or trail behind fairing block 200. Stem hole bottom 222 is located in lateral cutout 224 such that the stem of the sonar transducer may pass through stem hole bottom 222 to the opposite side of fairing block 200.

As illustrated, bolt/nut hole 226 may be substantially disposed in a tail portion of fairing block 200 in lateral cutout 224. Thus, bolt/nut hole 226 may accept, hold, and/or secure a tail bolt and/or nut, where the tail bolt/nut may help secure fairing block 200 to the hull and/or prevent fairing block 200 from rotating, shifting, and/or moving with respect to a surface of hull 105b. In additional or alternative embodiments, bolt/nut hole 226 may be positioned within a tab portion formed behind rounded tail 232 and approximately the same height/thickness as rounded tail 232, to provide clearance such that a bolt and/or nut may be adjusted and/or replaced while a sonar transducer (e.g., sonar transducer 236 of FIG. 2B) is coupled within fairing block 200 and/or mounted to hull 105b of mobile structure 101, thereby providing for easier installation and/or adjustment of fairing block 200. Alignment nub 228 may be disposed within and/or behind the lateral cutout 224. Alignment nub 228 may be inserted into or mated with a respective alignment recess on a top face of a sonar transducer to help securely align the sonar transducer with fairing block 200, such as during installation and/or replacement of the sonar transducer. Tail edge 230 and rounded tail 232 may be adjacent to the lateral cutout edges 216 and 218, and left side tail 220. It should be noted that tail edge 230 and rounded tail 232 may be formed, shaped, and/or molded to fit a shape of the sonar transducer to facilitate a hydrodynamic design to minimize overall drag. In some embodiments, tail edge 230 and rounded tail 232 may be modified to include a trailing edge that substantially mirrors leading edge 202. Backing flange 234 may be provided at a top surface of fairing block 200 to facilitate mounting and/or installation, including cutting of fairing block 200 according to a selected dead rise angle, for example.

Figure 2B:
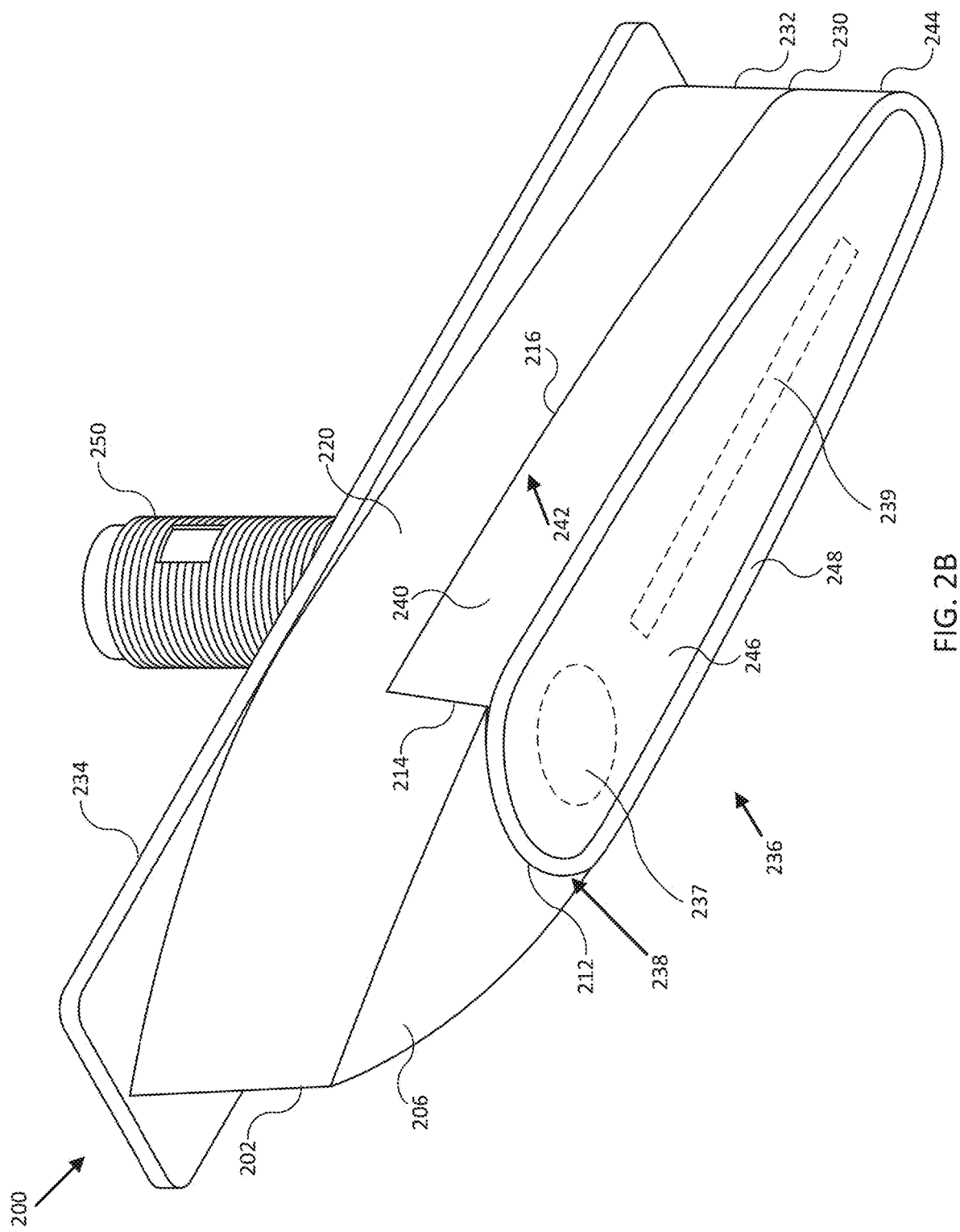

FIG. 2B illustrates a front-left-bottom perspective view of fairing block 200 including transducer 236 disposed within lateral cutout 224 of FIG. 2A, in accordance with an embodiment of the disclosure. As shown, fairing block 200 may be formed, shaped, and/or molded to fit sonar transducer 236. In some embodiments, sonar transducer 236 may have an approximate body length of 200-220 mm, and/or an approximate body height of 120-140 mm. In various embodiments, sonar transducer 236 may be implemented with rounded toe 238 on the front end and rounded heel 244 at the rear end. In some embodiments, the width of rounded toe 238 may be wider than the width of rounded heel 244, in order to facilitate an overall hydrodynamic shape of the transducer assembly including fairing block 200 and sonar transducer 236. Further, sonar transducer 236 may include a conical disk transducer element 237 and/or a bar or linear array transducer element 239 (e.g., configured to perform down-vision sonar) encompassed by rounded toe 238 and rounded heel 224. As such, sonar transducer 236 may be configured as a single or multi-channel sonar transducer. In general, fairing block 200 may be configured to orient sonar transducer 236 with respect to hull 105b such that working face 246 of sonar transducer 236 (e.g., and the active faces of disk transducer element 237 and/or linear transducer element 239) faces substantially downwards.

As shown, rounded toe 238 may tightly fit, align, and/or mate with cutout edge 212. Further, transducer lateral side 240 and transducer top face 242 may tightly fit, align and/or mate with lateral cutout edges 214 and 216 disposed behind leading edge 202, respectively. In particular, left side tail 220 may be substantially parallel with transducer lateral side 240 across the length of sonar transducer 236 such that left side tail 220 and lateral side 240 may form a substantially continuous flat and/or curved surface. As such, a maximum width of fairing block 200 may be substantially equal to or less than a maximum width of sonar transducer 236. As shown, a maximum height of fairing block 200 may be greater than a body height of sonar transducer 236, so as to provide sufficient clearance to allow fairing block 200 to be cut or otherwise modified to compensate for a dead rise angle ranging from 0 to 40 degrees, as described herein.

As shown, leading edge 202 may displace and/or divert water, bubbles, and/or debris laterally around fairing block 200 and/or sonar transducer 236. Further, leading edge bottom 206 may provide a relatively undisturbed or smooth flow of water over working face 246 and/or bottom portions of transducer side layer 248. In particular, leading edge bottom 206 may include a gradual curvilinearly chamfered surface configured to help divert bubbles in the water flow laterally away from working face 246. Thus, the curvilinearly chamfered surface may help prevent bubbles from flowing beneath working face 246, thereby helping to prevent cavitation near working face 246 and/or other portions of sonar transducer 236 such as bottom portions of transducer side layer 248 (if present) and/or lateral side 240. Further, lateral cutout 224 (generally outlined by cutout edges 212, 214 and 216 in FIG. 2B) may be designed to hold or encapsulate sonar transducer 236 and also expose portions of sonar transducer 236 to water. In particular, cutout edges 214 and 216 may be configured to expose a portion of rounded toe 238 and/or lateral side 240 of sonar transducer 236. In some instances, lateral side 240 may include one or more metallic side layers (e.g., metallic side layers 248) such as a copper, bronze, stainless steel, and/or other metallic or alloy layers. As such, the exposed portions of sonar transducer 236, including lateral side 240, may facilitate the dissipation of heat generated within sonar transducer 236 to the surrounding medium. In some instances, dissipating heat from sonar transducer 236 may prevent overheating, which can reduce risk of damage to sonar transducer 236 and/or allow sonar transducer 236 to be operated at higher pulse frequencies and/or pulse repetition frequencies. Notably, fairing block 200 may be used with types of sonar transducers that may otherwise overheat when mounted within conventional fairing blocks.

It should be noted that transducer heel 244 may tightly fit, align, and/or mate with tail edge 230 to facilitate a sleeker and/or more hydrodynamic design to minimize drag and/or to reduce turbulence that might otherwise arise with a discontinuous mating surface. In particular, rounded tail 232 may align with transducer heel 244 such that rounded tail 232 and transducer heel 244 form a continuous structure and/or surface. Yet, in some instances, rounded tail 232 and/or transducer heel 244 may be modified to form a trailing edge that substantially mirrors leading edge 202 as described above. Further, it should be noted that stem 250 of sonar transducer 236 may pass through stem hole 222 of FIG. 2A such that stem 250 protrudes out from the top side of backing flange 234 and into mobile structure 101 (e.g., into a bilge of mobile structure 101.

Figure 2C:
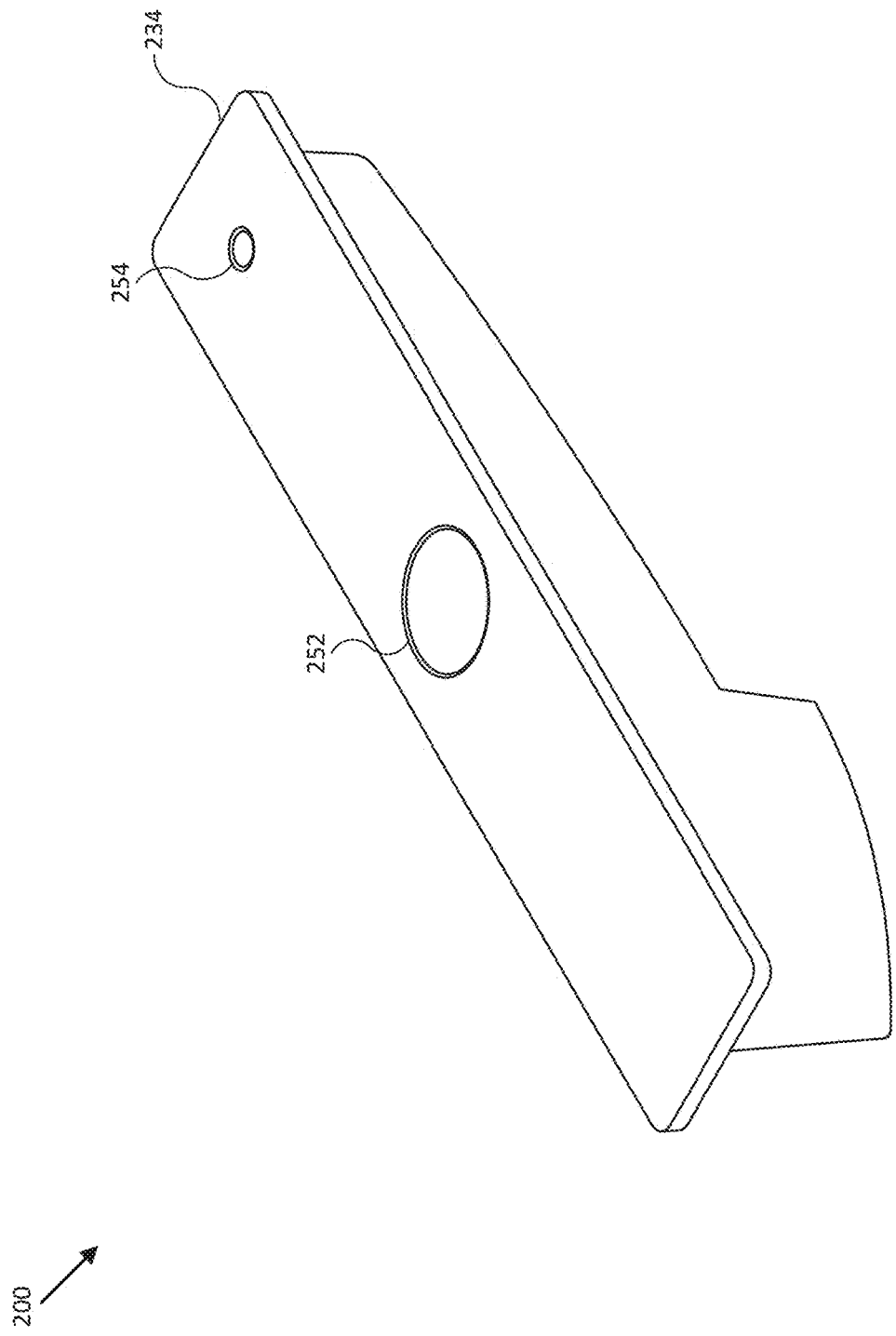

FIG. 2C illustrates a front-left-top perspective view of fairing block 200 in accordance with an embodiment of the disclosure. As shown, fairing block 200 may include stem hole top 252 configured to pass stem 250 through backing flange 234 as described above. Further, fairing block 200 may include bolt hole top 254 to pass the tail bolt through and secure the tail bolt to hull 105b to prevent fairing block 200 from rotating, shifting, and/or moving with respect to hull 105b.

Figure 2E:
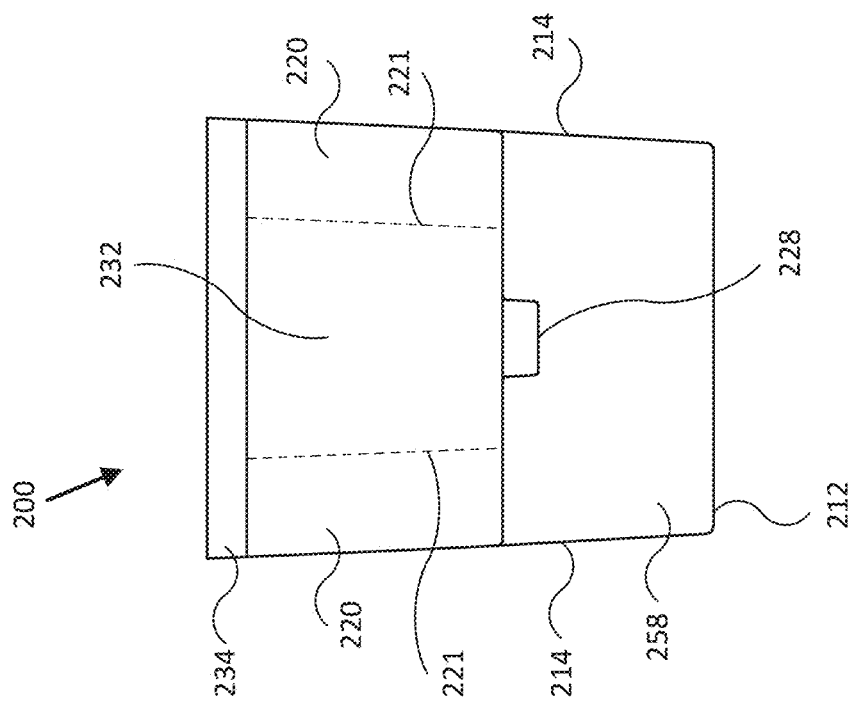
Figure 2D:
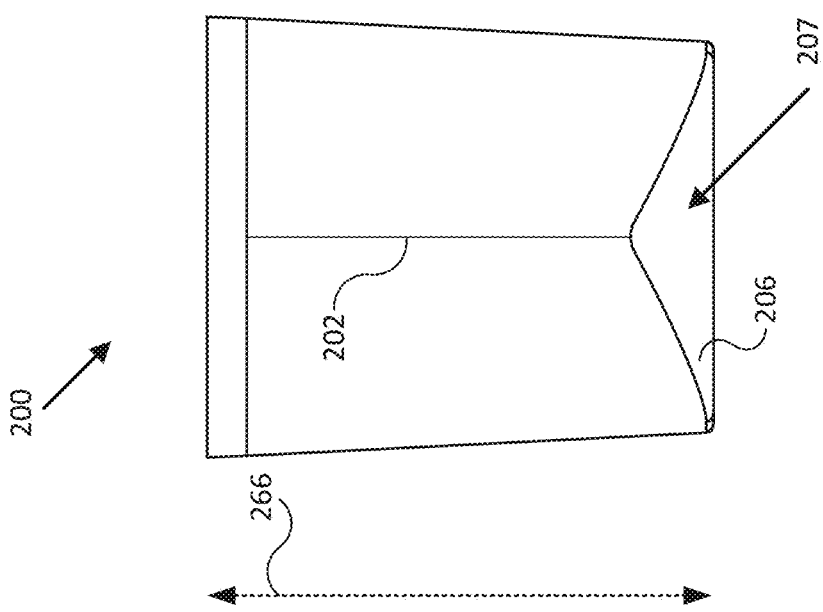

FIG. 2D illustrates is a front side elevation view of fairing block 200 in accordance with an embodiment of the disclosure. As shown, leading edge 202 and leading edge bottom 206 may displace water laterally around fairing block 200 and/or sonar transducer 236. Further, leading edge bottom 206 may include a curvilinearly chamfered surface 207 that provides a substantially smooth or undisturbed water flow over working face 246 of sonar transducer 236, thereby helping to prevent turbulence and/or cavitation near working face 246, as described herein. Also, height 266 may be a maximum height of fairing block 200 that is greater than a body height (e.g., body height 272 shown in FIG. 2K) of sonar transducer 264. FIG. 2E illustrates a rear side elevation view of fairing block 200 (without sonar transducer 236) in accordance with an embodiment of the disclosure. As shown, rounded toe surface 258 (e.g., bounded by cutout edge 212 and lateral cutout edges 214) may tightly fit, align, and/or mate with transducer rounded toe 238 shown in FIG. 2B. Dashed lines 220 roughly distinguish left and right side tails 220 from tail 232.

Figure 2F:
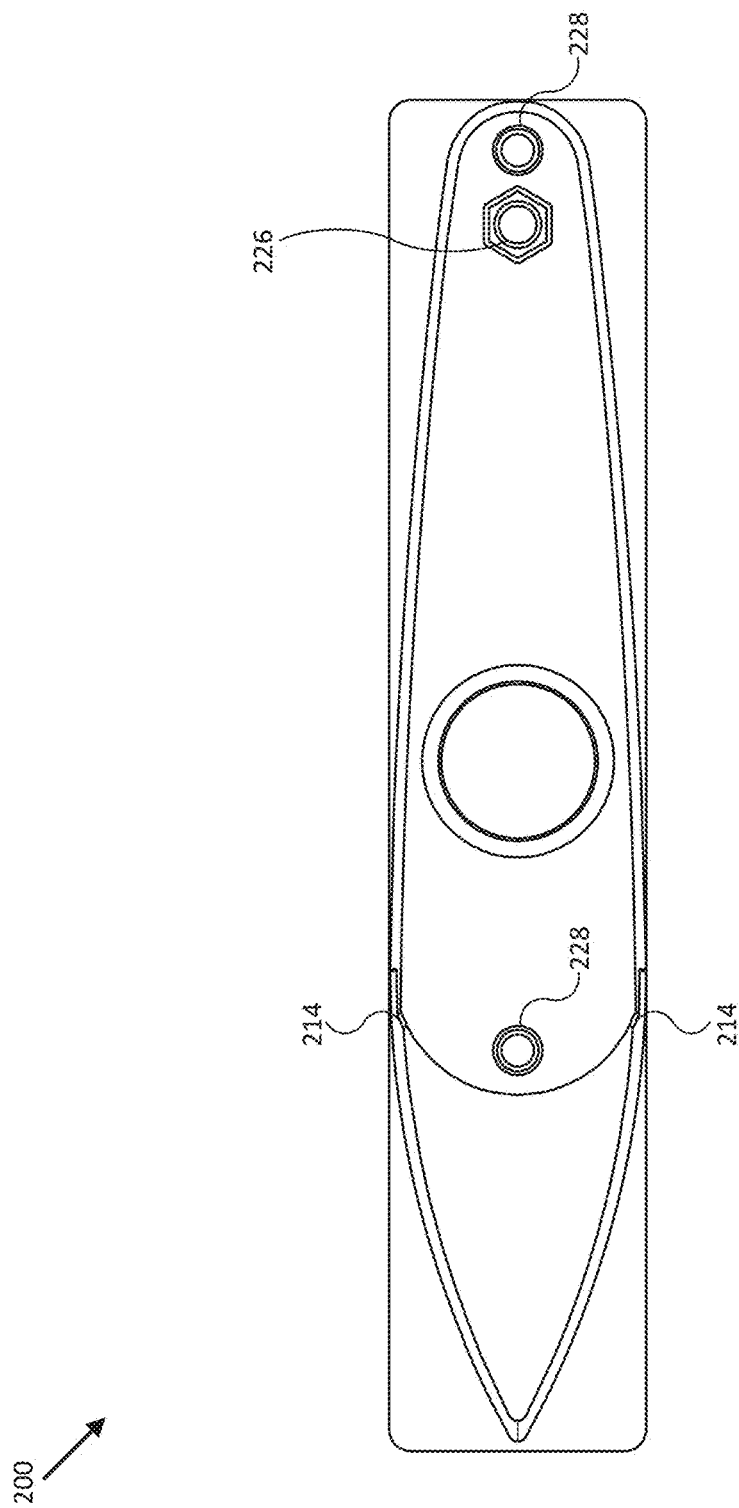

FIG. 2F is a bottom plan view of fairing block 200 in accordance with an embodiment of the disclosure. As shown, left and right lateral cutout edges 214 may be designed to hold or encapsulate sonar transducer 236 and also expose portions of sonar transducer 236 to water as described above. Further, alignment nubs 228 may be inserted into respective recesses in top surface 242 of sonar transducer 236 to align sonar transducer 236 to fairing block 200 during installation and/or coupling of sonar transducer 236 to fairing block 200.

Figure 2G:
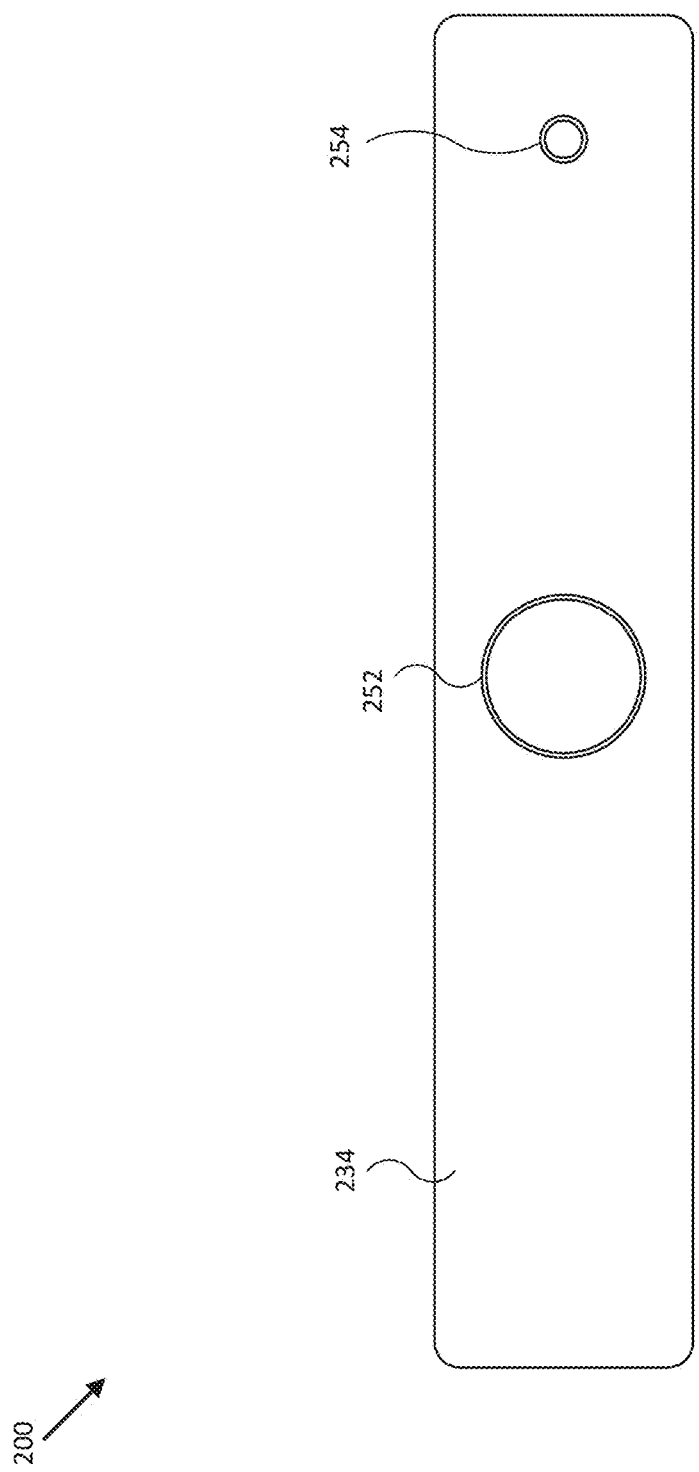
Figure 2H:
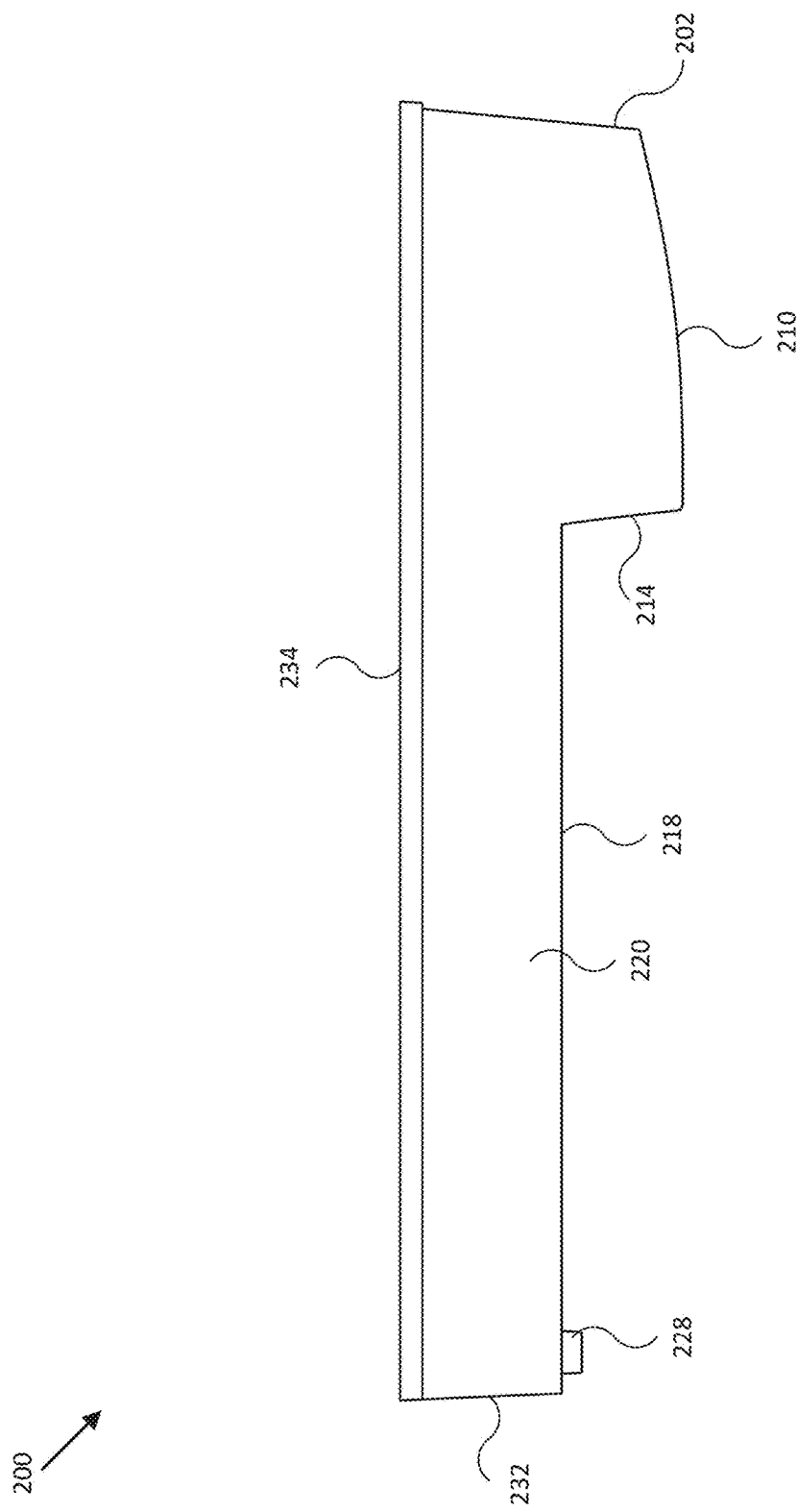
Figure 21:
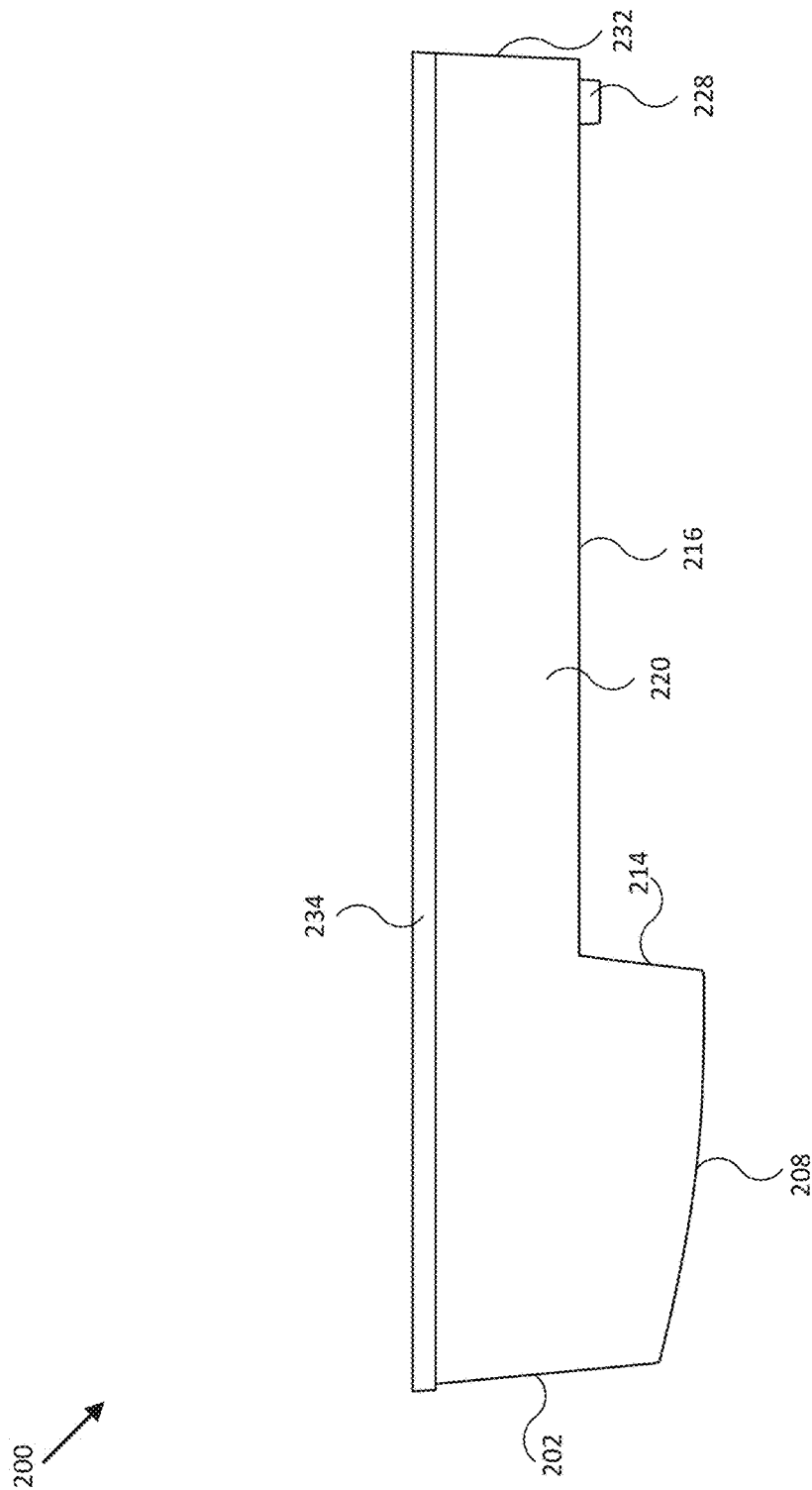
Figure 2J:
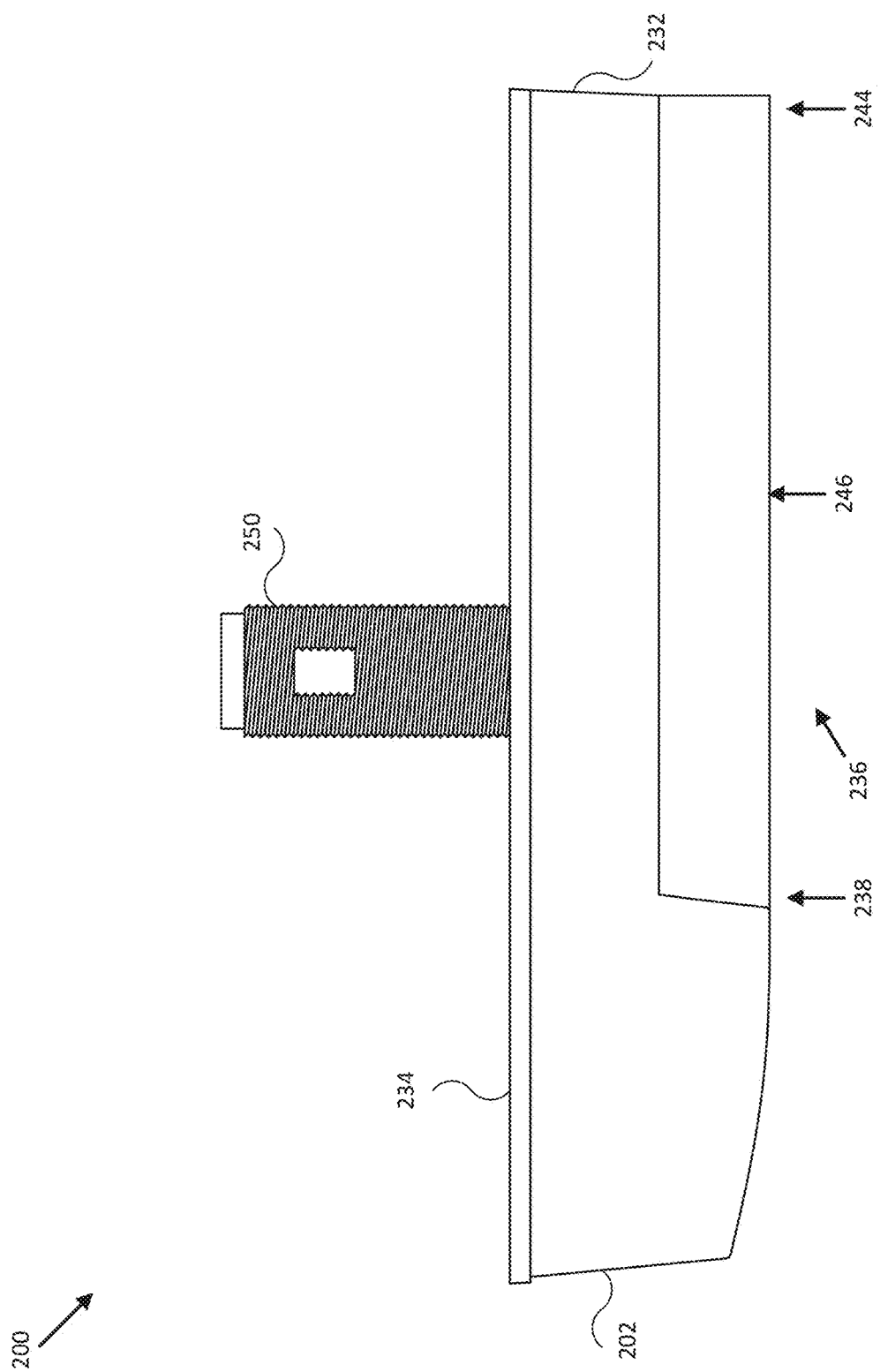

FIG. 2G is a top plan view of fairing block 200 in accordance with an embodiment of the disclosure, and includes features described in FIG. 2C. FIG. 2H is a right side elevation view of fairing block 200 in accordance with an embodiment of the disclosure, and includes right side versions of various features described in FIGS. 2A-B. FIG. 2I is a left side elevation view of fairing block 200 in accordance with an embodiment of the disclosure, and includes left side versions of various features described in FIGS. 2A-B. FIG. 2J illustrates a left side elevation view of fairing block 200 with transducer 236 in accordance with an embodiment of the disclosure, and includes left side versions of various features described in FIGS. 2A-B.

Figure 2K:
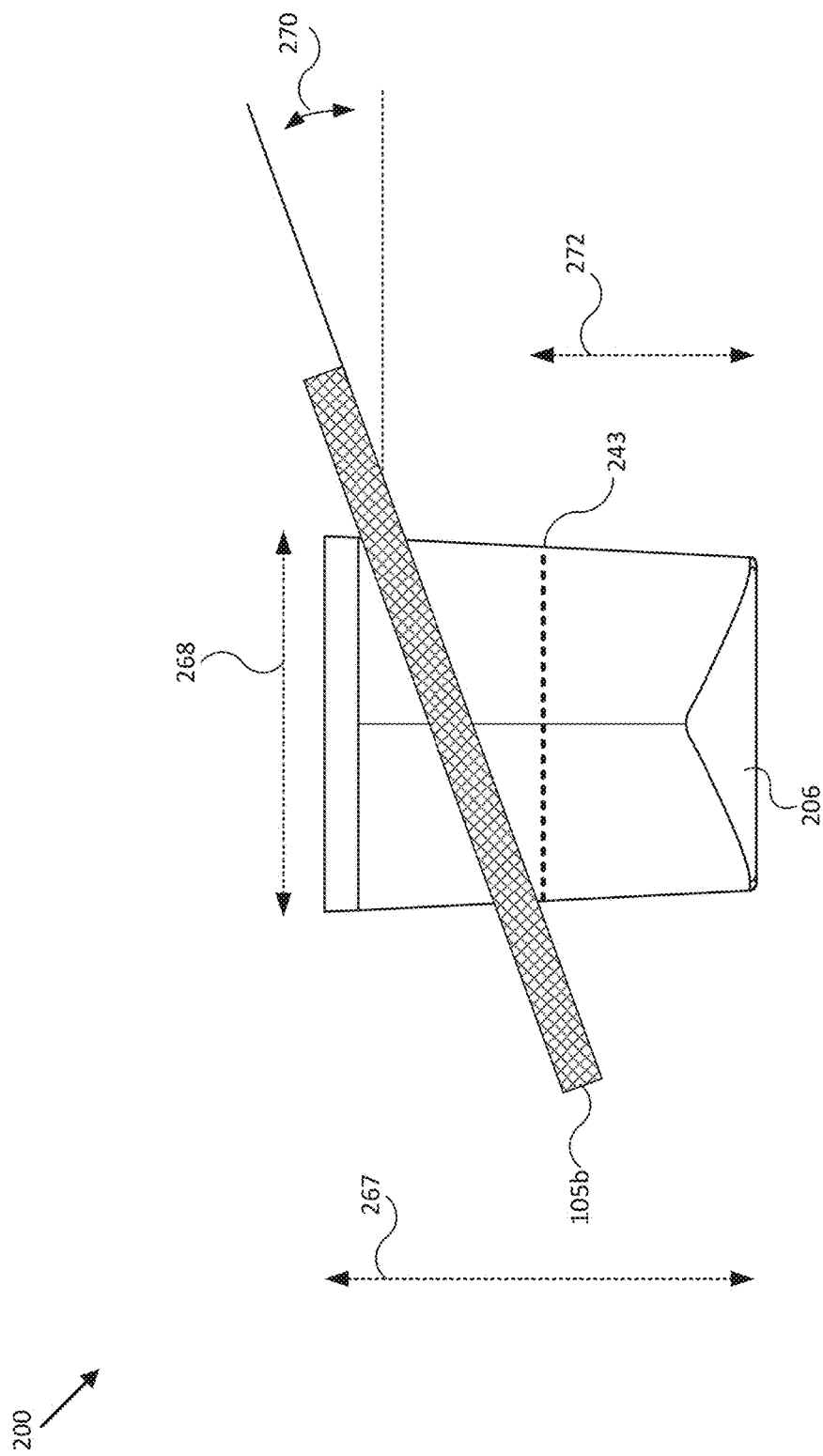

As noted, by reducing the size and/or profile of fairing block 200 presented to oncoming water or other medium, embodiments of fairing block 200 may be relatively hydrodynamic and/or form-fitting to sonar transducer 236 to help minimize drag and/or turbulence and corresponding degradation of operation of sonar transducer 236 while mobile structure 101 travels through water. FIG. 2K is a front side elevation view of fairing block 200 installed or mounted to hull 105b of mobile structure 101, as presented in FIG. 1B. As shown, fairing block 200 may include a width 268. In particular, width 268 may be a maximum width of fairing block 200 that may be substantially equal to or less than a maximum width of sonar transducer 246 (illustrated by dashed line 243). Yet further, a body height 272 of sonar transducer 236 may correspond to a length measured from top face 242 (at dashed line 243) to leading edge bottom 206/working face 246. As shown, height 267 includes the vertical thickness of hull 105b, and is related to maximum height 266 of fairing block 200 in FIG. 2D, which is selected to be greater than body height 272 of sonar transducer 264 in order to allow for fairing block 200 to be cut to compensate for a dead rise angle 270 of hull 105b. Thus, embodiments of fairing block 200 may be configured to provide sufficient clearance for fairing block 200 to be cut to compensate for dead rise angle 270 over the range of 0 to 40 degrees and be narrow enough to minimize turbulence, drag, and cavitation near transducer 236 while providing cooling water flow access to lateral sides 240 of sonar transducer 236.

Figure 3:
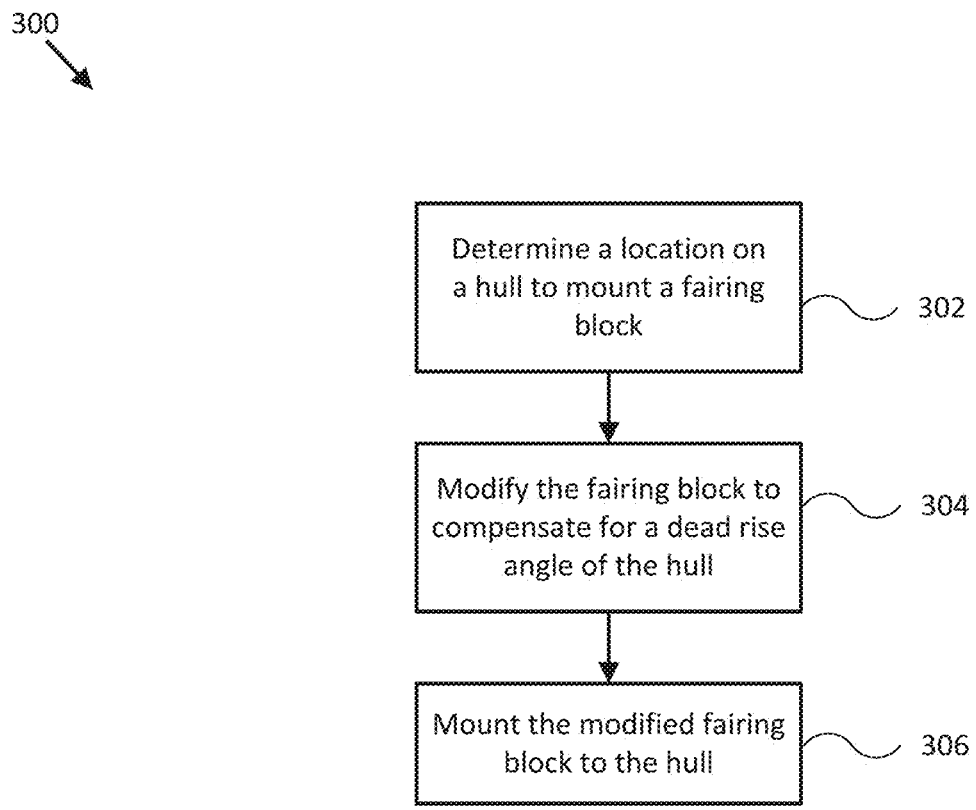
FIG. 3 illustrates a flow diagram of various operations to install or mount a fairing block to a mobile structure in accordance with an embodiment of the disclosure.

FIG. 3 illustrates a flow diagram of process 300 to mount and/or install fairing block 200 to a hull of a mobile structure in accordance with an embodiment of the disclosure. In some embodiments, the operations of FIG. 3 may be implemented as software instructions executed by one or more logic devices associated with corresponding manufacturing machines, industrial robotics, and/or mechanisms configured to install or mount fairing blocks and/or other parts to mobile structures. More generally, the operations of FIG. 3 may be implemented and/or facilitated with any combination of software instructions and/or machinery.

It should be appreciated that any step, sub-step, sub-process, or block of process 300 may be performed in an order or arrangement different from the blocks illustrated by FIG. 3. For example, in other embodiments, one or more blocks may be omitted, and other blocks may be included. Although process 300 is described with reference to fairing block 200, sonar transducer 236, and/or the respective embodiments in FIGS. 1A-2K, such that process 300 may be performed with other fairing blocks, sonar transducers, and/or related assemblies. Process 300 represents a method for mounting or installing fairing block 200 to a mobile structure such as those described above in accordance with embodiments of the disclosure. At the initiation of process 300, various dimensions of the mobile structure of may be determined, for example.

In block 302, a location on a hull may be determined to mount a fairing block. In some instances, the location may be determined or selected based on the type of hull, possibly with respect to the material and/or composition of the hull. For example, one location may be determined or selected based on the location being remote and/or distant from metallic portions and/or positive ground portions of the hull. The location may be selected to reduce risk of electrolytic corrosion between the sonar transducer and the metallic portions of the hull. Further, referring back to FIG. 1B, the location may be determined or selected to be one-third to one-half of the way along the load waterline length of hull 105b (e.g., half-way between the stern and bow of mobile structure 101). In particular, the location may be selected to ensure that fairing block stays under the waterline as mobile structure 101 travels at variable speeds, including higher speeds when the bow of mobile structure 101 may be elevated. Further, the starboard side of hull 105b may be selected where the propeller blades of propulsion system 170 are moving downward to prevent or minimize the bubbles and/or turbulence flowing to fairing block 200. Thus, it may be preferred that fairing block 200 is mounted remotely away from water intake and/or discharge openings, struts, fittings, and/or possible irregularities with hull 105b that may disturb water flows around fairing block 200.

In some embodiments, the location on the hull may be determined and/or selected based on the dead rise angle of the location. Referring back to FIG. 2K, the location on hull 105b may be determined based on dead rise angle 270 of hull 105b. In particular, maximum width 268 of fairing block 200 may be substantially equal to or less than a maximum width of sonar transducer 246 as shown by the dashed line 243 representing top face 242 in fairing block 200. As noted, maximum height 266 of fairing block 200 may be greater than a body height 272 of sonar transducer 246. Thus, fairing block 200 may provide sufficient clearance (e.g., a difference between heights 267 and 272) to allow fairing block 200 to be cut and/or otherwise modified to compensate for a dead rise angle 270 ranging from 0 to 40 degrees. Thus, fairing block 200 may provide a number of locations on hull 105b to mount fairing block 200.

In block 304, the fairing block may be modified to compensate for a dead rise angle of the hull at the location determined in block 302. For example, as shown in FIG. 2K, fairing block 200 may be cut into a first portion (e.g., a top portion shown above hull 105b) and a second portion (e.g., a bottom portion shown below hull 105b) to compensate for dead rise angle 270 at the determined location. Thus, fairing block 200 may be cut in an angle through fairing block 200 that substantially matches dead rise angle 270 of hull 105b. It should be noted that other modifications may be made to fairing block 200 with rasp and/or other power tools, possibly to shape fairing block 200 to fit closely with hull 105b and/or any irregularities of hull 105b.

In block 306, the modified fairing block may be mounted to the hull. In some instances, fairing block 200 may be mounted to hull 105b separately or in combination with sonar transducer 236. In particular, fairing block 200 may be manufactured separately or in combination with sonar transducer 236. As noted, fairing block 200 may be cut into a first top portion positioned above hull 105b and a second bottom portion positioned below hull 105b. Thus, the first and second portions of fairing block 200 may be placed proximate to an inside and/or outside of hull 105b at the determined location. Further, one or more holes may be drilled into the hull to mount fairing block 200 and possibly also sonar transducer 236. For example, referring back to FIG. 2A-B, a hole may be drilled into hull 105b such that stem 250 may fit through the hole in hull 105b. Referring back to FIGS. 2A and 2C, a second hole may be drilled into hull 105b such that the tail bolt may fit through the second hole so as to prevent fairing block 200 from rotating, shifting, and/or moving with respect to one or more surfaces of hull 105b.

As described above, sonar transducer 236 may be coupled to a portion of fairing block 200. As described herein, sonar transducer 236 includes rounded toe 238 at a front end of sonar transducer 236 and rounded heel 244 at a rear end of sonar transducer 236. In some embodiments, a width of rounded toe 238 may be wider than a width of rounded heel 244. Further, lateral cutout 224 outlined by edges 214 and/or 216 may be configured to expose at least a portion of rounded toe 238 and/or lateral sides 240 of sonar transducer 236. In some instances, sonar transducer 236 may be coupled to a portion of fairing block 200 prior to mounting to hull 105b. As noted, fairing block 200 may include one or more alignment nubs 128 disposed within and/or behind one or more lateral cutouts outlined by edges 214, 216, and/or 218. As such, one or more alignment nubs 228 may mate with corresponding one or more alignment recesses in top face 242 of sonar transducer 236 to help securely align sonar transducer 236 with fairing block 200.

In some embodiments, one or more marine sealants may be applied to surfaces of fairing block 200 that make contact with the interior of hull 105b and the exterior of hull 105b. Further, the sealants may be applied to the holes drilled for fitting stem 250 and/or the tail bolt. As such, stem 250 and/or the tail bolt may be pushed through the holes to squeeze out the excess sealants. It should also be noted that a wire or cable connected to transducer 236 may be routed through stem 250 and connected appropriately with one or more sonar systems described above in relation to FIGS. 1A-1B.

Figure 4:
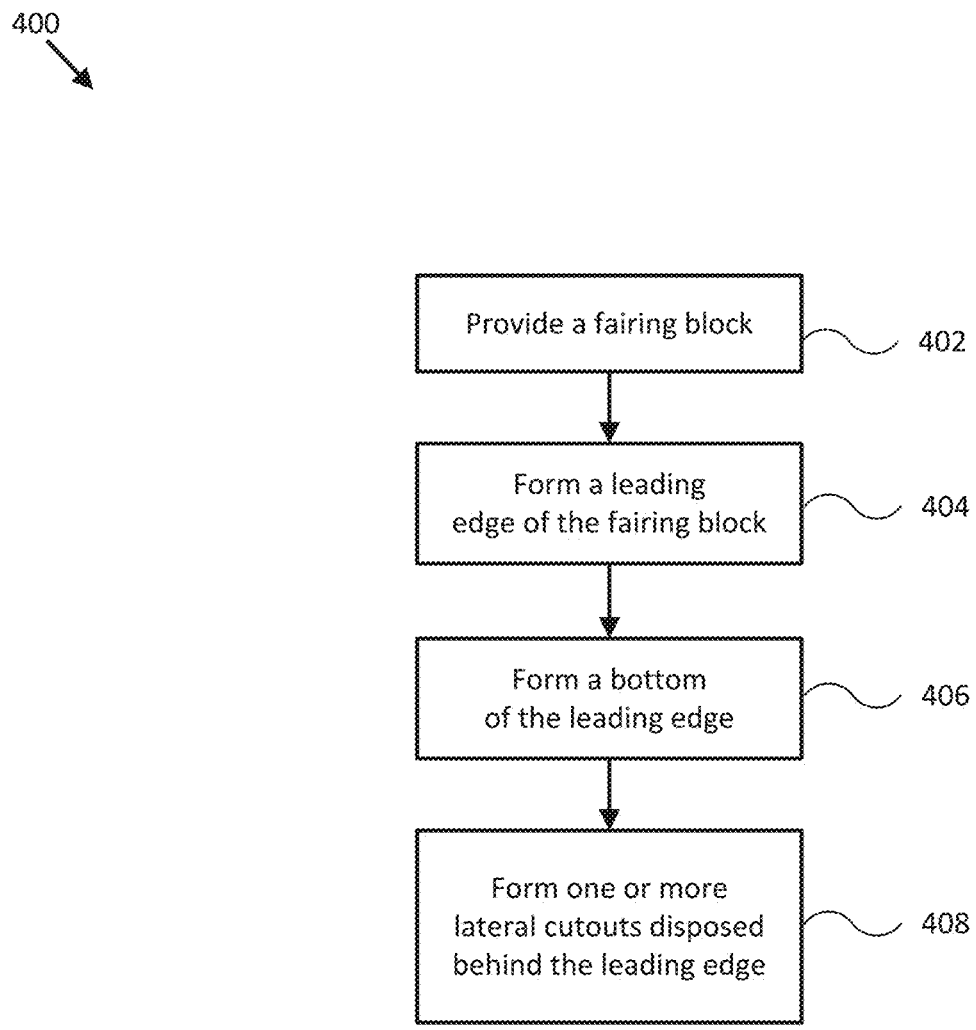
FIG. 4 illustrates a flow diagraph of various operations to provide a fairing block in accordance with an embodiment of the disclosure.

FIG. 4 illustrates a flow diagram of process 400 to provide fairing block 200 in accordance with an embodiment of the disclosure. In some embodiments, the operations of FIG. 4 may be implemented as software instructions executed by one or more logic devices associated with corresponding manufacturing machines, industrial robotics, and/or mechanisms configured to manufacture fairing blocks, sonar transducers, and/or other parts of mobile structures. More generally, the operations of FIG. 4 may be implemented and/or facilitated with any combination of software instructions and/or machinery.

It should be appreciated that any step, sub-step, sub-process, or block of process 400 may be performed in an order or arrangement different from the embodiments illustrated by FIG. 4. For example, in other embodiments, one or more blocks may be omitted, other blocks may be included, and/or one or more blocks may be combined with process 300 described above. Although process 400 is described with reference to fairing block 200, sonar transducer 236, and/or the respective views in FIGS. 1A-2K, process 400 may be performed to provide other fairing blocks, sonar transducers, and/or related assemblies. Process 400 represents a method for providing fairing block 200 in accordance with embodiments of the disclosure.

In block 402, a fairing block may be provided. In some instances, fairing block 200 may be provided or manufactured separately or as part of a sonar system/module, such as sonar system 110 described above. Further, as noted, fairing block 200 may be manufactured separately or in combination with (e.g., coupled with) sonar transducer 236. In some instances, fairing block 200 may be provided to couple sonar transducer 236 to hull 105b of a mobile structure. In particular, fairing block 200 may include one or more materials selected to substantially electrically isolate sonar transducer 236 from hull 105b to help prevent electrolytic corrosion of sonar transducer 236.

In block 404, a leading edge of the fairing block may be formed. For example, leading edge 202 of fairing block 200 may be formed to displace water and/or bubbles laterally around sonar transducer 236 while mobile structure 101 is in motion. In particular, leading edge 200 may divert bubbles in the water laterally around fairing block 200 and/or sonar transducer 236.

In block 406, a bottom of the leading edge may be formed. As noted, leading edge bottom 206 may be configured to provide a substantially undisturbed water flow over working face 246 of sonar transducer 236 while mobile structure is in motion. In particular, leading edge bottom 206 may include a curvilinearly chamfered surface configured to prevent cavitation along working face 246 of sonar transducer 236. Further, the curvilinearly chamfered surface may be configured to divert bubbles in the water flow laterally away from working face 246 of sonar transducer 236.

In block 408, one or more lateral cutouts disposed behind the leading edge may be formed. As noted, lateral cutouts 224 (e.g., provided by lateral cutout edges 214, 216, and 218) may expose lateral sides of sonar transducer 236 to the water. In various embodiments, lateral cutouts 224 may extend substantially to a tail 232 of fairing block 200 and thereby expose all lateral surfaces of sonar transducer 236 to water except for a portion of toe 238 disposed directly behind leading edge 202, bottom 206, and/or cutout edge 212.

In some embodiments, fairing block 200 may be provided with a bolt hole formed and/or disposed substantially in a tail portion (e.g., adjacent tail 232) of fairing block 200. As noted, the bolt hole may accept a tail bolt that is configured to help secure the fairing block to the hull and/or prevent the fairing block from rotating while secured to the hull. In some instances, sonar transducer 236 may be coupled to fairing block 200. As such, one or more alignment nubs 228 may be formed on fairing block 200. In particular, alignment nubs 228 may be disposed within and/or behind lateral cutout 224 and/or lateral cutout edges 214, 216, and 218. As such, one or more alignment nubs 228 may mate with corresponding one or more alignment recesses in top face 242 of sonar transducer 236 to help securely align sonar transducer 236 with fairing block 200. As noted, lateral sides 240 of sonar transducer 236 may include one or metallic side layers 248. As such, lateral cutout 224 (e.g., delineated by lateral cutout edges 214, 216, and 218) of fairing block 200 may expose portions (e.g., lateral sides 240) of metallic side layers 248 to the water to help dissipate heat generated within sonar transducer 236.

It is contemplated that any of the methods or processes 300 and/or 400, separately or in combination, may be performed to provide a fairing block and mount/install the fairing block with or without the sonar transducer to a mobile structure. Thus, embodiments of the present disclosure can thus provide a fairing block producing less turbulence, drag, and related cavitation relative to conventional fairing blocks, and embodiments may be manufactured using less material than larger conventional fairing blocks, which results in overall savings in manufacturing cost. Moreover, the relatively reduced size allows embodiments to be mounted to smaller hulls and/or to relatively small portions of a hull that are disposed between common unmountable hull features, such as spray rails. In addition, the reduced profile to oncoming water allows embodiments to more effectively divert bubbles in water laterally rather than underneath the fairing block and/or coupled sonar transducer. In particular, embodiments may include a gradual curvilinearly chamfered surface along a bottom of a leading edge that is configured to encourage smooth (e.g., substantially turbulence/cavitation free) flow of water over a working face of a sonar transducer. As described herein, such bottom surface may be curved as described yet present a low profile to oncoming water in order not to draw bubbles in the water beneath the transducer assembly. As such, embodiments married with a sonar transducer as described herein may provide substantially noise free sonar data and/or imagery while the transducer assembly and the mobile structure it is attached to are travelling through water at relatively high speeds (e.g., relative to sonar systems with conventional wider and generally larger fairing blocks), which can be used to assist in relatively safe navigation of a mobile structure and/or to assist in the operation of other systems, devices, and/or sensors coupled to the mobile structure.

Figure 5A:
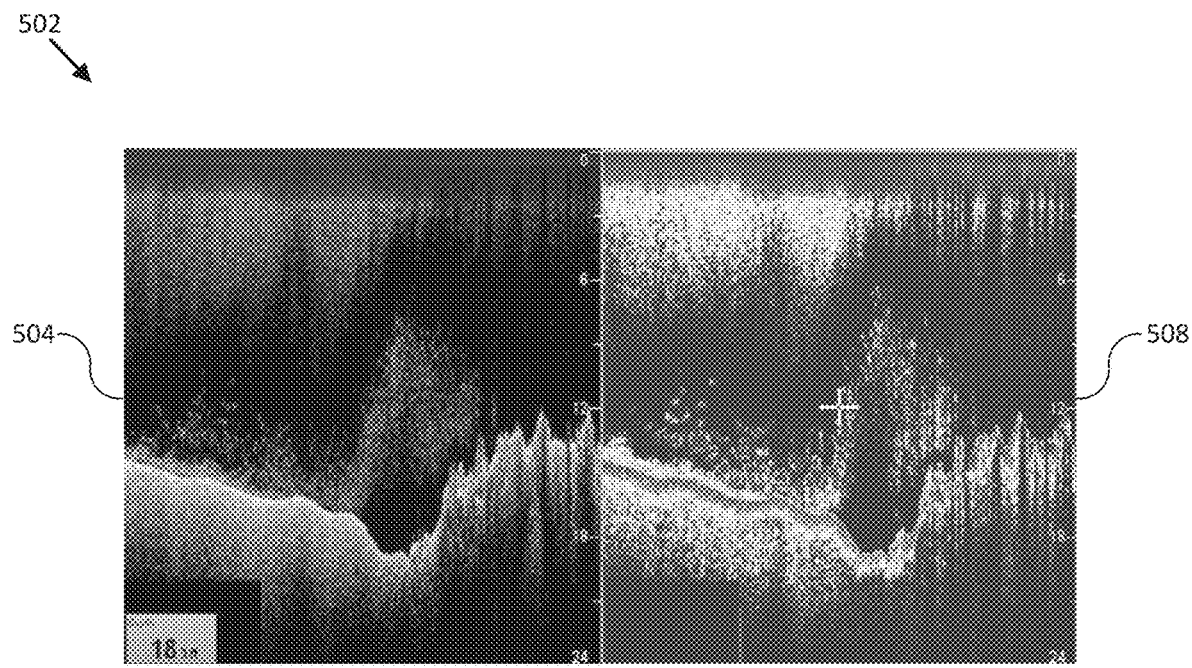
FIGS. 5A-B illustrate displays of sonar data acquired using a sonar transducer mounted to a fairing block in accordance with an embodiment of the disclosure.
Figure 5B:
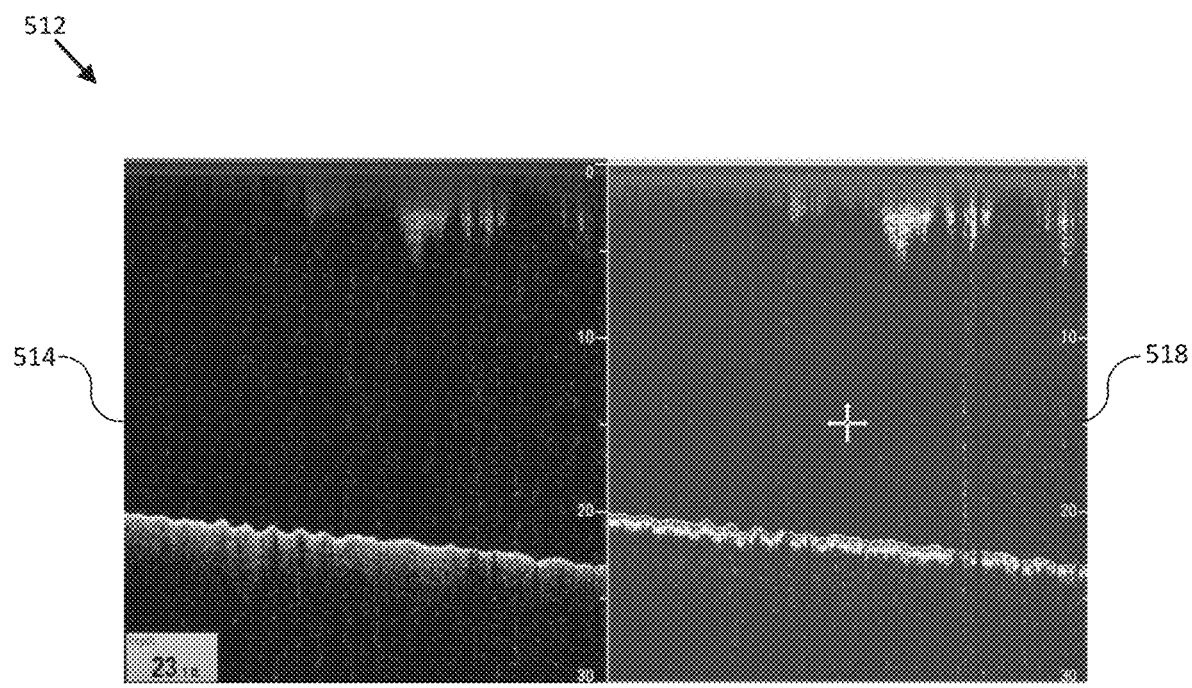

FIGS. 5A-B illustrate displays of sonar data acquired using a sonar transducer mounted to a fairing block in accordance with an embodiment of the disclosure. In particular, displays 502 and 512 each show two types of sonar data provided by different transducer elements disposed within the same sonar transducer, which is mounted to hull 105*b* of mobile structure 101. For example, sonar data corresponding to displays 502 and 512 may be captured by sonar system 110 (e.g., transducer assembly 112) and generated and/or rendered by user interface 120 to produce displays 502 and/or 512. Further, sonar data corresponding to displays 502 and 512 may be acquired using sonar transducer 236 in fairing block 200 mounted to hull 105*b*.

Display 502 of FIG. 5A includes sonar data 504 (e.g., from transducer element 239 of FIG. 2B) and sonar data 508 (e.g., from transducer element 237 of FIG. 2B), which was acquired at a speed of approximately 32 mph. Display 512 of FIG. 5B includes sonar data 514 (e.g., from transducer element 239 of FIG. 2B) and sonar data 518 (e.g., from transducer element 237 of FIG. 2B), which was acquired at a speed of approximately 37 mph. As can be seen from the two displays 502 and 512, embodiments of the present disclosure allow relatively noise free and reliable sonar data to be acquired at significantly higher speeds (e.g., greater than 20 mph, as described herein) than those achievable by conventional systems.

Figure 6:
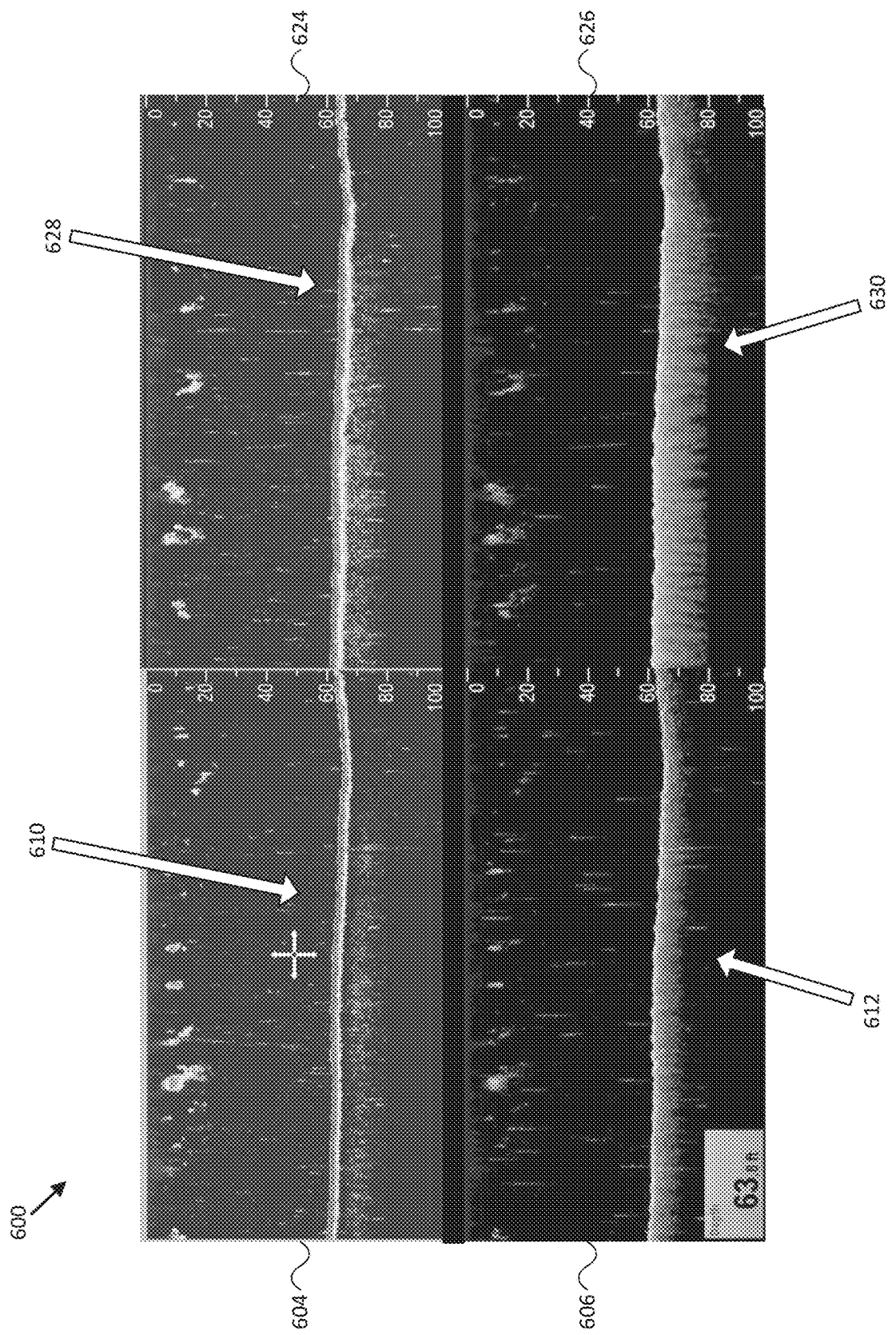
FIG. 6 illustrates a comparison of sonar data acquired conventionally against sonar data acquired using a sonar transducer mounted to a fairing block in accordance with an embodiment of the disclosure.

For context, FIG. 6 illustrates a comparison 600 of sonar data acquired conventionally against sonar data acquired using a sonar transducer mounted to a fairing block in accordance with an embodiment of the disclosure. In particular, comparison 600 includes sonar data 604 and 606 acquired using a conventionally mounted sonar system, and sonar data 624 and 626 acquired using an embodiment of the present disclosure, while both were traveling at approximately 18 mph (e.g., ~16 knots). As can be seen from comparison 600, detection of features (e.g., within water column 610 and/or of bottom 612) in sonar data 604 and/or 606 (e.g., from two different conventional transducer elements) is significantly degraded relative to detection of similar features (e.g., within water column 628 and/or of bottom 630) in sonar data 624 and 626 (e.g., from respective transducer elements 237 and 239 of transducer 236 in FIG. 2B). For example, sonar data 624 and 626 acquired utilizing embodiments of fairing block 200 provides more detail, less noise, and better returns, as shown in the sonar data associated with water column 628 and bottom 630. Notably, sonar data 604 and 606 acquired conventionally provide less detail as shown in the sonar data associated with water column 610 and bottom 612. This tendency becomes more pronounced as the speed of the mobile structure increases, such that bottom detection/tracking and/or other feature recognition by conventional systems typically becomes unreliable or impossible above speeds of approximately 18 mph (e.g., at medium speeds), while embodiments of the present disclosure have been shown to produce reliable sonar data at speeds equal to or exceeding 37 mph (e.g. approximately twice the speeds achievable by conventional systems, or more generally at high speeds, in the context of sonar data acquisition).

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into substeps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
    a fairing block configured to couple a sonar transducer to a hull of a mobile structure, wherein the fairing block comprises:
        a leading edge comprising a front edge, a leading left side, a leading right side, and a bottom configured to displace water laterally around the sonar transducer, wherein the leading left side and the leading right side meet along the front edge, and wherein the bottom of the leading edge extends between the leading left and right sides and comprises a curvilinearly chamfered surface disposed below the leading left and right sides that is configured to provide a substantially undisturbed water flow over a working face of the sonar transducer to reduce cavitation along the working face of the sonar transducer; and
        one or more lateral cutouts disposed behind the leading edge and configured to expose one or more lateral sides of the sonar transducer to the water.

2. The system of claim 1, wherein:
    the leading edge is configured to divert bubbles in the water laterally around the fairing block and/or sonar transducer.

3. The system of claim 1, wherein the curvilinearly chamfered surface is configured to divert bubbles in the water flow laterally away from the working face of the sonar transducer.

4. The system of claim 1, wherein:
    a first maximum width of the fairing block is substantially equal to or less than a second maximum width of the sonar transducer; and
    a maximum height of the fairing block is greater than a body height of the sonar transducer and is configured to provide sufficient clearance to allow the fairing block to be cut to compensate for a dead rise angle ranging from 0 to 40 degrees.

5. The system of claim 1, wherein:
    the fairing block comprises a bolt hole disposed substantially in a tail portion of the fairing block; and
    the bolt hole is configured to accept a tail bolt that is configured to help secure the fairing block to the hull and prevent the fairing block from rotating while secured to the hull.

6. The system of claim 1, wherein:
    the fairing block comprises one or more alignment nubs disposed within and/or behind the one or more lateral cutouts; and
    the one or more alignment nubs are configured to mate with corresponding one or more alignment recesses in a top face of the sonar transducer to help securely align the sonar transducer with the fairing block.

7. The system of claim 1, wherein:
    the fairing block comprises a material selected to substantially electrically isolate the sonar transducer from the hull to prevent electrolytic corrosion of the sonar transducer.

8. The system of claim 1, further comprising the sonar transducer, wherein:
    the sonar transducer comprises a rounded toe at a front end of the sonar transducer and a rounded heel at a rear end of the sonar transducer; and
    a first width of the rounded toe is wider than a second width of the rounded heel.

9. The system of claim 1, wherein the one or more lateral cutouts are configured to expose at least a portion of a rounded toe of the sonar transducer.

10. The system of claim 1, wherein the lateral sides of the sonar transducer comprise a metallic layer, and wherein the one or more lateral cutouts of the fairing block are configured to expose at least a portion of the metallic layer to the water to help dissipate heat generated within the sonar transducer.

11. A method comprising:
    providing a fairing block configured to couple a sonar transducer to a hull of a mobile structure, wherein the providing the fairing block comprises:
    forming a leading edge of the fairing block comprising a front edge, a leading left side, and a leading right side configured to displace water laterally around the sonar transducer, wherein the leading left side and the leading right side meet along the front edge;
    forming a bottom of the leading edge that extends between the leading left and right sides of the leading edge, wherein the bottom of the leading edge comprises a curvilinearly chamfered surface disposed below the leading left and right sides that is configured to provide a substantially undisturbed water flow over a working face of the sonar transducer to reduce cavitation along the working face of the sonar transducer; and
    forming one or more lateral cutouts disposed behind the leading edge that are configured to expose one or more lateral sides of the sonar transducer to the water.

12. The method of claim 11, wherein:
    the leading edge is configured to divert bubbles in the water laterally around the fairing block and/or sonar transducer.

13. The method of claim 11, wherein the curvilinearly chamfered surface is configured to divert bubbles in the water flow laterally away from the working face of the sonar transducer.

14. The method of claim 11, further comprising determining a location on the hull to mount the fairing block based, at least in part, on a dead rise angle at the determined location, wherein:
    a first maximum width of the fairing block is substantially equal to or less than a second maximum width of the sonar transducer; and
    a maximum height of the fairing block is greater than a body height of the sonar transducer and is configured to provide sufficient clearance to allow the fairing block to be cut to compensate for the dead rise angle ranging from 0 to 40 degrees.

15. The method of claim 12, further comprising:
    cutting the fairing block into first and second portions configured to compensate for the dead rise angle at the determined location; and
    placing the first and/or second portions of fairing block proximate to an inside and/or outside of the hull at the determined location.

16. The method of claim 11, wherein:

the providing the fairing block comprises forming a bolt hole disposed substantially in a tail portion of the fairing block; and the bolt hole is configured to accept a tail bolt that is configured to help secure the fairing block to the hull and prevent the fairing block from rotating while secured to the hull.

17. The method of claim 11, further comprising coupling the sonar transducer to at least a portion of the fairing block, wherein:

the providing the fairing block comprises forming one or more alignment nubs disposed within and/or behind the one or more lateral cutouts; and the one or more alignment nubs are configured to mate with corresponding one or more alignment recesses in a top face of the sonar transducer to help securely align the sonar transducer with the fairing block.

18. The method of claim 11, wherein:

the fairing block comprises a material selected to substantially electrically isolate the sonar transducer from the hull to prevent electrolytic corrosion of the sonar transducer.

19. The method of claim 11, further comprising coupling the sonar transducer to at least a portion of the fairing block, wherein:

the sonar transducer comprises a rounded toe at a front end of the sonar transducer and a rounded heel at a rear end of the sonar transducer;

a first width of the rounded toe is wider than a second width of the rounded heel; and the one or more lateral cutouts are configured to expose at least a portion of a rounded toe of the sonar transducer.

20. The method of claim 11, wherein:

the lateral sides of the sonar transducer comprise a metallic layer, and wherein the one or more lateral cutouts of the fairing block are configured to expose at least a portion of the metallic layer to the water to help dissipate heat generated within the sonar transducer.

* * * * *